(12) United States Patent
Muramatsu

(10) Patent No.: US 8,376,624 B2
(45) Date of Patent: *Feb. 19, 2013

(54) ROLLING CONTACT MEMBER AND ROLLING BEARING

(75) Inventor: Katsutoshi Muramatsu, Kuwana (JP)

(73) Assignee: NTN Corporation, Osaka (JP)

( * ) Notice: Subject to any disclaimer, the term of this patent is extended or adjusted under 35 U.S.C. 154(b) by 363 days.

This patent is subject to a terminal disclaimer.

(21) Appl. No.: 12/666,217

(22) PCT Filed: May 30, 2008

(86) PCT No.: PCT/JP2008/059988
§ 371 (c)(1),
(2), (4) Date: Dec. 22, 2009

(87) PCT Pub. No.: WO2009/001648
PCT Pub. Date: Dec. 31, 2008

(65) Prior Publication Data
US 2010/0189385 A1   Jul. 29, 2010

(30) Foreign Application Priority Data

Jun. 27, 2007  (JP) ................. 2007-169463
Jun. 29, 2007  (JP) ................. 2007-172323
Jun. 29, 2007  (JP) ................. 2007-172337

(51) Int. Cl.
*F16C 33/62* (2006.01)
(52) U.S. Cl. .................... 384/492; 384/907.1
(58) Field of Classification Search .............. 384/492, 384/279, 907.1
See application file for complete search history.

(56) References Cited

U.S. PATENT DOCUMENTS

| | | | |
|---|---|---|---|
| 4,127,416 | A | 11/1978 | Lumby et al. |
| 4,280,973 | A | 7/1981 | Moskowitz et al. |
| 5,538,558 | A | 7/1996 | Ookouchi et al. |
| 5,718,519 | A | 2/1998 | Ookouchi et al. |
| 5,965,471 | A | 10/1999 | Brandt et al. |
| 6,043,176 | A | 3/2000 | Brandt et al. |
| 2002/0003228 | A1 | 1/2002 | Niwa et al. |
| 2005/0224763 | A1 | 10/2005 | Komatsu et al. |
| 2008/0159905 | A1 | 7/2008 | Watanabe et al. |

(Continued)

FOREIGN PATENT DOCUMENTS

| | | |
|---|---|---|
| CN | 1534212 A | 10/2004 |
| CN | 2799293 Y | 7/2006 |

(Continued)

OTHER PUBLICATIONS

European Search Report issued in European Patent Application No. 08764906.7-1523, mailed May 19, 2011.

(Continued)

*Primary Examiner* — Thomas R Hannon
(74) *Attorney, Agent, or Firm* — McDermott Will & Emery LLP

(57) ABSTRACT

An outer ring, an inner ring and a ball that are a rolling contact member formed of sintered β sialon inexpensive and capable of reliably ensuring sufficient durability, is constituted of a sintered body containing β sialon as a main component and having a remainder formed of an impurity, and the outer ring, the inner ring and the ball have raceway/rolling contact surfaces, i.e., an outer ring raceway surface, an inner ring raceway surface and a ball rolling contact surface included in a portion having an outer ring high density layer, an inner ring high density layer and a ball high density layer higher in density than an inner portion.

8 Claims, 14 Drawing Sheets

FIG.2

U.S. PATENT DOCUMENTS

| | | |
|---|---|---|
| 2009/0023577 A1 | 1/2009 | Oda |
| 2010/0022313 A1 | 1/2010 | Muramatsu |
| 2010/0189385 A1 | 7/2010 | Muramatsu |

FOREIGN PATENT DOCUMENTS

| | | |
|---|---|---|
| DE | 39 38 644 A1 | 5/1990 |
| DE | 197 46 286 A1 | 4/1999 |
| EP | 0 556 833 A1 | 8/1993 |
| EP | 1829844 A1 | 9/2007 |
| EP | 2 123 924 A1 | 11/2009 |
| JP | 58-52949 B | 11/1983 |
| JP | 59-199581 A | 11/1984 |
| JP | 3-98334 | 10/1991 |
| JP | 4-290613 | 10/1992 |
| JP | 5-096486 | 12/1993 |
| JP | 10-36174 A | 2/1998 |
| JP | 2000-009146 | 1/2000 |
| JP | 2001-192258 A | 7/2001 |
| JP | 2001-294478 A | 10/2001 |
| JP | 2002-295477 A | 10/2002 |
| JP | 2003-013965 | 1/2003 |
| JP | 2003-322154 A | 11/2003 |
| JP | 2004-091272 | 3/2004 |
| JP | 2005-075652 | 3/2005 |
| JP | 2005-194154 | 7/2005 |
| JP | 2007-132486 A | 5/2007 |
| JP | 2007-182334 | 7/2007 |
| JP | 2008-162851 | 7/2008 |
| JP | 2009-008228 A | 1/2009 |
| WO | WO 2006/057232 A1 | 6/2006 |
| WO | WO-2008/075535 A1 | 6/2008 |

OTHER PUBLICATIONS

Chinese Office Action, with English translation thereof, issued in Chinese Patent Application No. 200880022409.6, dated Jun. 24, 2011.

U.S. Office Action issued in U.S. Appl. No. 13/233,683, dated Jan. 30, 2012.

Chinese Office Action, w/ English translation thereof, issued in Chinese Patent Application No. CN 200880112439.6 dated Feb. 14, 2012.

Extended European Search Report, issued in European Patent Application No. 09 766 674.7, dated Dec. 29, 2011.

United States Office Action issued in U.S. Appl. No. 12/738,517 dated Jun. 12, 2012.

United States Office Action issued in U.S. Appl. No. 13/233,683 dated May 17, 2012.

Chinese Office Action issued in Chinese Patent Application No. CN 20111033226.8 dated May 2, 2012.

English Language Translation of Japanese Office Action issued in Japanese Patent Application No. 2007-169462, mailed Oct. 27, 2009.

European Search Report issued in European Patent Application No. 07 83 2483, mailed Jan. 26, 2011.

Chinese Office Action, w/ English translation thereof, issued in Chinese Patent Application No. CN 200780047380.2 dated Sep. 10, 2010.

United States Office Action issued in U.S. Appl. No. 12/520,430 dated Sep. 27, 2011.

United States Office Action issued in U.S. Appl. No. 12/520,430 dated Mar. 28, 2012.

United States Notice of Allowance issued in U.S. Appl. No. 12/520,430 dated Jul. 12, 2012.

United States Notice of Allowance issued in U.S. Appl. No. 12/738,517 mailed Sep. 26, 2012.

Watanabe, Outline and Future Prospect of Mass Production by Direct Synthesis of Ultrafine Powdery Meramix w/full English Abtract, Material Stage, vol. 7, No. 1, pp. 99-102, 2007.

Japanese Office Action, w/ English Translation thereof issued in Japanese Patent No. 2007-169463 dated Oct. 16, 2012.

Japanese Office Action, w/ English Translation thereof issued in Japanese Patent No. 2007-172323 dated Oct. 16, 2012.

Japanese Office Action, w/ English Translation thereof issued in Japanese Patent No. 2007-172337 dated Oct. 16, 2012.

Chinese Office Action, w/English Translation thereof issued in Chinese Patent No. 200980123538.9 dated Sep. 29, 2012.

Japanese Office Action, w/English Translation thereof issued in Japanese Patent No. 2007-169462 dated Oct. 2, 2012.

Japanese Office Action, w/English Translation thereof issued in Japanese Patent No. 2007-172890 dated Oct. 16, 2012.

0.2mm

US 8,376,624 B2

ROLLING CONTACT MEMBER AND ROLLING BEARING

RELATED APPLICATIONS

This application is the U.S. National Phase under 35 U.S.C. §371 of International Application No. PCT/JP2008/059988, filed on May 30, 2008, which in turn claims the benefit of Japanese Application No. 2007-169463, filed on Jun. 27, 2007, Japanese Application No. 2007-172323, filed on Jun. 29, 2007 and Japanese Application No. 2007-172337, filed Jun. 29, 2007, the disclosures of which Applications are incorporated by reference herein.

TECHNICAL FIELD

The present invention relates generally to rolling contact members, rolling bearings, and methods of producing rolling contact members, and particularly to rolling contact members, rolling bearings, and methods of producing rolling contact members, that adopt a sintered body containing β-sialon as a main component. The present invention also contemplates torque transmission members for universal joints, universal joints, and methods of producing torque transmission members for universal joints, and particularly to torque transmission members for universal joints, universal joints, and methods of producing torque transmission members for universal joints, that adopt a sintered body containing β-sialon as a main component. The present invention also contemplates sliding devices, sliding members and methods of producing the sliding devices and members, and particularly to sliding devices, sliding members and methods of producing the sliding devices and members, that adopt a sintered body containing β-sialon as a main component.

BACKGROUND ART

Silicon nitride, sialon and similar ceramics characteristically not only have a smaller specific gravity and are more corrosive-resistant than steel but are also insulating. Accordingly, if ceramics are adopted as a material for a component of rolling bearings (including hub units) including a race member and a rolling element, such as a race member, and a rolling element, they can provide bearings and the like reduced in weight and also prevent rolling bearings from having short life as their components corrode and are thus damaged or electrolytically corrode.

Furthermore, a hub unit, which is a type of rolling bearing, is often used in an environment having a possibility of receiving moisture therein and hence having insufficient lubricity. Ceramic rolling elements, race members and similar rolling contact components are characteristically less damageable in such an insufficiently lubricating environment as above. Accordingly, for example, a hub unit with a rolling contact component formed with ceramics adopted as a material can exhibit improved durability when it is employed in an insufficiently lubricating environment.

Furthermore, if ceramics are adopted as a material for a component of a universal joint including a torque transmission member therefor, e.g., the torque transmission member therefor, they can provide a universal joint reduced in weight and also prevent the universal joint from having short life as a torque transmission member therefor corrodes and is thus damaged or electrolytically corrode.

Furthermore, a universal joint has a torque transmission member therefor rolling and stopping repeatedly on a surface of a race member, and between the torque transmission member for the universal joint and the race member there is not sufficient oil film provided. Furthermore, a universal joint is often used in an environment having a possibility of receiving moisture therein and hence having insufficient lubricity. A ceramic torque transmission member for a universal joint is characteristically less damageable in such an insufficiently lubricating environment as above. Accordingly, for example, a universal joint with a torque transmission member therefor formed with ceramics adopted as a material can exhibit improved durability when it is employed in an insufficiently lubricating environment.

Furthermore, if ceramics are adopted as a material for a sliding member that constitutes a plain bearing, a fluid dynamic bearing unit or a similar sliding device, and contacts another adjacent member and also slides relative to the other member, they can provide a sliding device reduced in weight and also prevent the sliding device from having short life as its sliding member corrodes and is thus damaged or a component electrolytically corrodes.

However, silicon nitride, sialon and similar ceramics require higher production cost than steel, and adopting ceramics as a material for components of rolling bearings, universal joints or sliding devices disadvantageously increases their production costs.

In recent years, there has been developed a method of producing β-sialon, a type of ceramics, inexpensively by adopting a production process including combustion synthesis (see Japanese Patent Laying-open No. 2004-91272 (Patent Document 1), Japanese Patent Laying-open No. 2005-75652 (Patent Document 2) and Japanese Patent Laying-open No. 2005-194154 (Patent Document 3) for example). This allows one to consider adopting β-sialon as a material for components of rolling bearings, universal joints or sliding devices to produce them inexpensively.

Patent Document 1: Japanese Patent Laying-open No. 2004-91272
Patent Document 2: Japanese Patent Laying-open No. 2005-75652
Patent Document 3: Japanese Patent Laying-open No. 2005-194154

DISCLOSURE OF THE INVENTION

Problems to be Solved by the Invention

To adopt the above β-sialon as a material for a component of a rolling bearing, however, the component of the rolling bearing that is formed of β-sialon must have a sufficient rolling contact fatigue life. Rolling contact fatigue life does not necessarily match a member's fracture strength and the like, and it cannot be said that a component of a rolling bearing that is formed of β-sialon necessarily has a sufficient rolling contact fatigue life. Thus it has not been easy either to ensure that a rolling bearing including a component formed of β-sialon reliably has sufficient durability.

Furthermore, to adopt the above β-sialon as a material for a torque transmission member of a universal joint, however, the torque transmission member of the universal joint that is formed of β-sialon must have sufficient durability. More specifically, the universal joint has the torque transmission member sliding on a raceway and therewhile rolling thereon as the universal joint operates. Accordingly the torque transmission member for the universal joint receives rolling and sliding contact fatigue. Durability against rolling and sliding contact fatigue does not necessarily match the torque transmission member's fracture strength and the like, and it cannot be said that the torque transmission member for the universal joint that is formed of β-sialon necessarily has sufficient durability against rolling and sliding contact fatigue. Thus it has not been easy either to ensure that the universal joint including the torque transmission member therefor formed of β-sialon reliably has sufficient durability.

Furthermore, to adopt the above β-sialon as a material for a sliding member, however, the sliding member that is formed of β-sialon must have a sufficient wear resistance. Wear resistance does not necessarily match the member's fracture strength and the like, and it cannot be said that a sliding member that is formed of β-sialon necessarily has a sufficient wear resistance. Thus it has not been easy either to ensure that a sliding device including a sliding member formed of β-sialon reliably has sufficient durability.

Accordingly the present invention contemplates a rolling contact member serving as a component of a rolling bearing, that is formed of a sintered β-sialon (a sintered body containing β-sialon as a main component) inexpensive and capable of reliably ensuring sufficient durability, and a method of producing the same, and a rolling bearing (including a hub unit) including that rolling contact member.

Furthermore, the present invention also contemplates a torque transmission member for a universal joint, that is formed of a sintered β-sialon (a sintered body containing β-sialon as a main component) inexpensive and capable of reliably ensuring sufficient durability, and a method of producing the same, and a universal joint that includes that torque transmission member for the universal joint.

Furthermore, the present invention also contemplates a sliding member that is formed of a sintered β-sialon (a sintered body containing β-sialon as a main component) inexpensive and capable of reliably ensuring sufficient durability, and a method of producing the same, and a sliding device including the sliding member.

Means for Solving the Problems

The present invention in one aspect provides a rolling contact member in a rolling bearing. The rolling contact member is one of a race member and a rolling element disposed in contact with the race member on an annular raceway. The rolling contact member is configured of a sintered body that contains β-sialon as a main component and has a remainder formed of an impurity. The rolling contact member has a rolling contact surface serving as a surface contacting another rolling contact member, and the rolling contact surface is included in a portion having a high density layer higher in density than an inner portion.

The present invention in another aspect provides a rolling contact member in a rolling bearing. The rolling contact member is one of a race member and a rolling element disposed in contact with the race member on an annular raceway. The rolling contact member is configured of a sintered body that contains β-sialon as a main component and has a remainder formed of a sintering additive and an impurity. The rolling contact member has a rolling contact surface serving as a surface contacting another rolling contact member, and the rolling contact surface is included in a portion having a high density layer higher in density than an inner portion.

The present inventor has investigated in detail a relationship between the rolling contact fatigue life of a rolling contact member containing β-sialon as a main component and the rolling contact member's configuration, and as a result obtained the following finding and arrived at the present invention.

More specifically, when a sintered body containing β-sialon as a main component, as described above, is used to produce a rolling contact member, its density significantly affects rolling contact fatigue life, one of the most important durability for the rolling contact member. The present rolling contact member is formed of a sintered body containing β-sialon as a main component and has a raceway/rolling contact surface included in a portion having a high density layer higher in density than an inner portion. As a result the present invention can provide a rolling contact member formed of a sintered body containing as a main component a β-sialon that is inexpensive and capable of reliably ensuring sufficient durability as it achieves improved rolling contact fatigue life.

Herein, a high density layer is a layer in a sintered body that is low in porosity (or high in density), and can be inspected for example as follows: Initially, the rolling contact member is cut along a cross section perpendicular to a surface of the rolling contact member and the cross section is mirror-lapped. The mirror-lapped cross section is then imaged through an optical microscope with oblique illumination (a dark field) at a magnification for example of approximately 50-100 times, and stored in an image equal to or larger than 300 dots per inch (DPI). In doing so, a portion that is white in color is observed as a white color portion, which corresponds to a portion high in porosity (or low in density). Accordingly, a portion having a white color portion having a small area ratio is higher in density than a portion having a white color portion having a large area ratio. An image processor is used to binarize the stored image by a brightness threshold value and a white color portion's area ratio is thus measured and therefrom the imaged portion's density can be obtained. In other words, the present rolling contact member has a raceway/rolling contact surface included in a portion having a high density layer having a white color portion having a smaller area ratio than an inner portion does. Note that preferably the imaging is done randomly at least five locations and the area ratio is evaluated from an average value thereof. Furthermore, the rolling contact member at an inner portion has a white color portion having an area ratio for example equal to or larger than 15%.

Furthermore, to provide the rolling contact member with further increased rolling contact fatigue life, it is preferable that the high density layer has a thickness equal to or larger than 100 μm. Furthermore the sintering additive adopted in the rolling contact member in another aspect as described above can be selected from at least one of an oxide, a nitride and an oxynitride of magnesium (Mg), aluminum (Al), silicon (Si), titanium (Ti) and a rare earth element. Furthermore, to achieve a function and effect equivalent to that of the rolling contact member in one aspect of the present invention, it is desirable that the sintering additive be equal to or smaller than 20% by mass of the sintered body.

In the above rolling contact member preferably when the high density layer is observed in cross section with an optical microscope with oblique illumination, the layer exhibits a portion observed as a portion white in color having an area ratio equal to or smaller than 7%.

The high density layer improved in density to an extent allowing a white color portion to have an area ratio equal to or smaller than 7% provides the rolling contact member with further increased rolling contact fatigue life. The present rolling contact member can thus achieve further increased rolling contact fatigue life.

In the above rolling contact member preferably the high density layer has a surface included in a higher density layer higher in density than another portion of the high density layer.

A higher density layer further higher in density and provided at a portion including a surface of the high density layer can further enhance the rolling contact member's durability against rolling contact fatigue and thus provide the rolling contact member with further increased rolling contact fatigue life.

In the above rolling contact member preferably when the higher density layer is observed in cross section with an optical microscope with oblique illumination, the layer exhibits a portion observed as a portion white in color having an area ratio equal to or smaller than 3.5%.

The higher density layer improved in density to an extent allowing a white color portion to have an area ratio equal to or smaller than 3.5% provides the rolling contact member with further increased rolling contact fatigue life. The present rolling contact member can thus achieve further increased rolling contact fatigue life.

The present invention provides a rolling bearing comprising: a race member; and a plurality of rolling elements disposed in contact with the race member on an annular raceway. At least one of the race member and the rolling element is the rolling contact member of the present invention as described above.

The present rolling bearing that includes the present rolling contact member that is inexpensive and also capable of reliably ensuring sufficient durability can be a rolling bearing including a rolling contact member formed of a sintered $\beta$-sialon inexpensive and capable of reliably ensuring sufficient durability.

The present invention in one aspect provides a method of producing a rolling contact member in a rolling bearing, the rolling contact member being one of a race member and a rolling element disposed in contact with the race member on an annular raceway, comprising the steps of: preparing a powdery source material that contains $\beta$-sialon as a main component and has a remainder formed of an impurity; shaping the powdery source material generally into a geometry of the rolling contact member to provide a shaped body; and sintering the shaped body at a pressure equal to or smaller than 1 MPa.

The present invention in another aspect provides a method of producing a rolling contact member in a rolling bearing, the rolling contact member being one of a race member and a rolling element disposed in contact with the race member on an annular raceway, comprising the steps of: preparing a powdery source material that contains $\beta$-sialon as a main component and has a remainder formed of a sintering additive and an impurity; shaping the powdery source material generally into a geometry of the rolling contact member to provide a shaped body; and sintering the shaped body at a pressure equal to or smaller than 1 MPa.

When a sintered body of ceramics is to be used to produce a rolling contact member, a method is generally employed that adopts hot isostatic press (HIP), gas pressured sintering (GPS), or similar pressure sintering (normally, a method sintering at a pressure equal to or larger than 10 MPa) to reduce or prevent a defect reducing the rolling contact member's rolling contact fatigue life. This conventional production method can reduce the rolling contact member's porosity and thus produce a rolling contact member high in density. The conventional production method adopting pressure sintering, however, invites an increased production cost. Furthermore, the production method adopting pressure sintering alters the rolling contact member at a surface portion in material to cause an anomaly layer. This necessitates removing that anomaly layer in a process for finishing the rolling contact member, which further increases the rolling contact member's production cost. In contrast, if pressure sintering is not adopted, the rolling contact member's porosity is increased and a defect is thus caused and the rolling contact member's rolling contact fatigue life is decreased.

The present inventor has found that sintering a shaped body that is formed of $\beta$-sialon at a pressure equal to or smaller than 1 MPa to produce a rolling contact member can provide the rolling contact member at a portion that includes a raceway/rolling contact surface that is formed at a surface thereof with a high density layer higher in density than an inner portion thereof. The present method of producing a rolling contact member that includes the step of sintering a shaped body that contains $\beta$-sialon as a main component at a pressure equal to or smaller than 1 MPa can provide a portion that includes a raceway/rolling contact surface (a surface) with a high density layer while reducing/eliminating an increased production cost associated with pressure sintering. Consequently the present method of producing a rolling contact member can inexpensively produce a rolling contact member formed of a sintered $\beta$-sialon capable of reliably ensuring sufficient durability.

Note that the step of sintering the shaped body is performed preferably at a pressure equal to or larger than 0.01 MPa to reduce or prevent decomposition of $\beta$-sialon, and more preferably at a pressure equal to or larger than the atmospheric pressure when cost reduction is considered. Furthermore, to provide the high density layer while reducing production cost, the step of sintering the shaped body is performed preferably at a pressure equal to or smaller than 1 MPa.

In the method of producing a rolling contact member, as described above, preferably, in the step of sintering the shaped body, the shaped body is sintered in a range of 1550° C. to 1800° C.

If the shaped body is sintered at a temperature less than 1550° C., it is not sintered to facilitate increasing it in density. Accordingly, the shaped body is sintered preferably at a temperature equal to or higher than 1550° C. and more preferably equal to or higher than 1600° C. In contrast, if the shaped body is sintered at a temperature exceeding 1800° C., the $\beta$-sialon may have coarse crystal grains resulting in a sintered body having poor mechanical characteristics. Accordingly, the shaped body is sintered preferably at a temperature equal to or lower than 1800° C. and more preferably equal to or lower than 1750° C.

In the method of producing a rolling contact member, as described above, preferably, in the step of sintering the shaped body, the shaped body is sintered in one of an atmosphere of an inert gas and an atmosphere of a gaseous mixture of nitrogen and oxygen.

Sintering the shaped body in an atmosphere of an inert gas can reduce or prevent the $\beta$-sialon's decomposition, microstructural variation, and the like. Furthermore, sintering the shaped body in an atmosphere of a gaseous mixture of nitrogen and oxygen allows a resultant sintered $\beta$-sialon to contain nitrogen and oxygen in a controlled amount.

The method of producing a rolling contact member, as described above, preferably, further includes the step of forming a surface of the shaped body before sintering the shaped body.

The shaped body that has been sintered is significantly increased in hardness and thus hard to work. Accordingly, for example sintering the shaped body and thereafter extensively working the shaped body to finish it as a rolling contact member invites an increased cost for producing the rolling contact member. In contrast, sintering the shaped body after working it to allow a finishing step or the like to be done such that the sintered shaped body is worked in a reduced amount allows a rolling contact member to be produced at a reduced cost. In particular, a production method adopting pressure sintering entails removing an anomaly layer, which entails working a sintered body in a relatively large amount. Thus, such a step does not have a large advantage. The present method of producing a rolling contact member adopts the step of sintering a shaped body that is formed of β-sialon at a pressure equal to or smaller than 1 MPa. This can reduce/ eliminate an amount of working to remove an anomaly layer and the step is thus significantly beneficial.

The method of producing a rolling contact member, as described above, preferably further includes the step of working a surface of the sintered shaped body to remove a portion including the surface, and the step of working removes the shaped body by a thickness equal to or smaller than 150 μm.

The present method of producing a rolling contact member provides a portion including a surface with a higher density layer aforementioned, and having a thickness of approximately 150 μm. Accordingly, when a sintered shaped body is to have a surface worked to remove a portion including that surface, e.g., when the sintered shaped body undergoes a finishing step, the finishing step that is done to remove the shaped body by a thickness equal to or smaller than 150 μm allows the rolling contact member to have a raceway/rolling contact surface with a higher density layer remaining therein. The step as described above allows a rolling contact member to be produced with further improved rolling contact fatigue life. Note that to ensure that the higher density layer remains, the step more preferably removes the sintered shaped body by a thickness equal to or smaller than 100 μm.

The present invention in one aspect provides a torque transmission member for a universal joint, provided in a universal joint between a race member connected to a first shaft member and a second shaft member rollably and slidably and transmitting rotation transmitted to one of the first shaft member and the second shaft member about an axis to the other of the first shaft member and the second shaft member. The torque transmission member is configured of a sintered body that contains β-sialon as a main component and has a remainder formed of an impurity. The torque transmission member has a contact surface serving as a surface contacting another member, and the surface is included in a portion having a high density layer higher in density than an inner portion.

The present invention in another aspect provides a torque transmission member for a universal joint, provided in a universal joint between a race member connected to a first shaft member and a second shaft member rollably and slidably and transmitting rotation transmitted to one of the first shaft member and the second shaft member about an axis to the other of the first shaft member and the second shaft member. The torque transmission member is configured of a sintered body that contains β-sialon as a main component and has a remainder formed of a sintering additive and an impurity. The torque transmission member has a contact surface serving as a surface contacting another member and the surface is included in a portion having a high density layer higher in density than an inner portion.

The present inventor has investigated in detail a relationship between the durability of a torque transmission member that is provided for a universal joint and contains β-sialon as a main component against rolling and sliding contact fatigue and the torque transmission member's configuration, and as a result obtained the following finding and arrived at the present invention.

More specifically, when a sintered body containing β-sialon as a main component, as described above, is used to produce a torque transmission member for a universal joint, its density significantly affects durability against rolling and sliding contact fatigue, one of the most important durability for the torque transmission member for the universal joint. The present torque transmission member for a universal joint is formed of a sintered body containing β-sialon as a main component and has a contact surface included in a portion having a high density layer higher in density than an inner portion. As a result the present invention can provide a torque transmission member for a universal joint, that is formed of a sintered body containing as a main component a β-sialon inexpensive and capable of reliably ensuring sufficient durability as it achieves improved durability against rolling and sliding contact fatigue.

Herein, a high density layer is a layer in a sintered body that is low in porosity (or high in density), and can be inspected for example as follows: Initially, the torque transmission member for a universal joint is cut along a cross section perpendicular to a surface of the torque transmission member for the universal joint and the cross section is mirror-lapped. The mirror-lapped cross section is then imaged through an optical microscope with oblique illumination (a dark field) at a magnification for example of approximately 50-100 times, and stored in an image equal to or larger than 300 dots per inch (DPI). In doing so, a portion that is white in color is observed as a white color portion, which corresponds to a portion high in porosity (or low in density). Accordingly, a portion having a white color portion having a small area ratio is higher in density than a portion having a white color portion having a large area ratio. An image processor is used to binarize the stored image by a brightness threshold value and a white color portion's area ratio is thus measured and therefrom the imaged portion's density can be obtained. In other words, the present torque transmission member for a universal joint has a contact surface included in a portion having a high density layer having a white color portion having a smaller area ratio than an inner portion does. Note that preferably the imaging is done randomly at least five locations and the area ratio is evaluated from an average value thereof. Furthermore, the torque transmission member for the universal joint has at an inner portion a white color portion having an area ratio for example equal to or larger than 15%.

Furthermore, to provide the torque transmission member for a universal joint with further increased durability against rolling and sliding contact fatigue, it is preferable that the high density layer has a thickness equal to or larger than 100 μm. Furthermore the sintering additive adopted in the torque transmission member for a universal joint in another aspect as described above can be selected from at least one of an oxide, a nitride and an oxynitride of magnesium (Mg), aluminum (Al), silicon (Si), titanium (Ti) and a rare earth element. Furthermore, to achieve a function and effect equivalent to that of the torque transmission member for a universal joint in one aspect of the present invention, it is desirable that the sintering additive be equal to or smaller than 20% by mass of the sintered body.

In the above torque transmission member for a universal joint preferably when the high density layer is observed in cross section with an optical microscope with oblique illumination, the layer exhibits a portion observed as a portion white in color having an area ratio equal to or smaller than 7%.

The high density layer improved in density to an extent allowing a white color portion to have an area ratio equal to or smaller than 7% provides the torque transmission member for a universal joint with further increased durability against rolling and sliding contact fatigue. The present torque transmission member for a universal joint can thus achieve further increased durability against rolling and sliding contact fatigue.

In the above torque transmission member for a universal joint preferably the high density layer has a surface included in a higher density layer higher in density than another portion of the high density layer.

A higher density layer further higher in density and provided at a portion including a surface of the high density layer can further enhance the torque transmission member for a universal joint in durability against rolling and sliding contact fatigue.

In the above torque transmission member for a universal joint preferably when the higher density layer is observed in cross section with an optical microscope with oblique illumination, the layer exhibits a portion observed as a portion white in color having an area ratio equal to or smaller than 3.5%.

The higher density layer improved in density to an extent allowing a white color portion to have an area ratio equal to or smaller than 3.5% provides the torque transmission member for a universal joint with further increased durability against rolling and sliding contact fatigue.

The present invention provides a universal joint comprising: a race member connected to a first shaft member; a torque transmission member arranged in contact with the race member rollably and slidably on a surface of the race member; and a second shaft member connected via the torque transmission member and the race member to the first shaft member. The universal joint transmits rotation transmitted to one of the first shaft member and the second shaft member about an axis to the other of the first shaft member and the second shaft member. The torque transmission member is the torque transmission member that is provided for a universal joint in accordance with the present invention as described above.

The present universal joint that includes the present torque transmission member for a universal joint, as described above, can provide a universal joint including a torque transmission member formed of a sintered β-sialon inexpensive and capable of reliably ensuring sufficient durability.

The present invention in one aspect provides a method of producing a torque transmission member for a universal joint, provided in a universal joint between a race member connected to a first shaft member and a second shaft member rollably and slidably and transmitting rotation transmitted to one of the first shaft member and the second shaft member about an axis to the other of the first shaft member and the second shaft member, comprising the steps of: preparing a powdery source material that contains β-sialon as a main component and has a remainder formed of an impurity; shaping the powdery source material generally into a geometry of the torque transmission member for the universal joint to provide a shaped body; and sintering the shaped body at a pressure equal to or smaller than 1 MPa.

The present invention in another aspect provides a method of producing a torque transmission member for a universal joint, provided in a universal joint between a race member connected to a first shaft member and a second shaft member rollably and slidably and transmitting rotation transmitted to one of the first shaft member and the second shaft member about an axis to the other of the first shaft member and the second shaft member, comprising the steps of: preparing a powdery source material that contains β-sialon as a main component and has a remainder formed of a sintering additive and an impurity; shaping the powdery source material generally into a geometry of the torque transmission member for the universal joint to provide a shaped body; and sintering the shaped body at a pressure equal to or smaller than 1 MPa.

When a sintered body of ceramics is to be used to produce a torque transmission member for a universal joint, a method is generally employed that adopts hot isostatic press (HIP), gas pressured sintering (GPS), or similar pressure sintering (normally, a method sintering at a pressure equal to or larger than 10 MPa) to reduce or prevent a defect reducing the torque transmission member's durability against rolling and sliding contact fatigue. This conventional production method can reduce the torque transmission member's porosity and thus produce a torque transmission member high in density for a universal joint. The conventional production method adopting pressure sintering, however, invites an increased production cost. Furthermore, the production method adopting pressure sintering alters the torque transmission member at a surface portion in material to cause an anomaly layer. This necessitates removing that anomaly layer in a process for finishing the torque transmission member, which further increases the cost for producing the torque transmission member. In contrast, if pressure sintering is not adopted, the torque transmission member's porosity is increased and a defect is thus caused, and the torque transmission member is impaired in durability against rolling and sliding contact fatigue.

The present inventor has found that sintering a shaped body that is formed of β-sialon at a pressure equal to or smaller than 1 MPa to produce a torque transmission member for a universal joint can provide the torque transmission member at a portion that includes a contact surface (a surface) that is formed at a surface thereof with a high density layer higher in density than an inner portion thereof. The present method of producing a torque transmission member for a universal joint that includes the step of sintering a shaped body that contains β-sialon as a main component at a pressure equal to or smaller than 1 MPa can provide a portion that includes a contact surface with a high density layer while reducing/eliminating an increased production cost associated with pressure sintering. Consequently the present method of producing a torque transmission member for a universal joint can inexpensively produce a torque transmission member formed of a sintered β-sialon capable of reliably ensuring sufficient durability for a universal joint.

Note that the step of sintering the shaped body is performed preferably at a pressure equal to or larger than 0.01 MPa to reduce or prevent decomposition of β-sialon, and more preferably at a pressure equal to or larger than the atmospheric pressure when cost reduction is considered. Furthermore, to provide the high density layer while reducing production cost, the step of sintering the shaped body is performed preferably at a pressure equal to or smaller than 1 MPa.

In the method of producing a torque transmission member for a universal joint, as described above, preferably, in the step of sintering the shaped body, the shaped body is sintered in a range of 1550° C. to 1800° C.

If the shaped body is sintered at a temperature less than 1550° C., it is not sintered to facilitate increasing it in density. Accordingly, the shaped body is sintered preferably at a temperature equal to or higher than 1550° C. and more preferably equal to or higher than 1600° C. In contrast, if the shaped body is sintered at a temperature exceeding 1800° C., the β-sialon may have coarse crystal grains resulting in a sintered body having poor mechanical characteristics. Accordingly, the shaped body is sintered preferably at a temperature equal to or lower than 1800° C. and more preferably equal to or lower than 1750° C.

In the method of producing a torque transmission member for a universal joint, as described above, preferably, in the step of sintering the shaped body, the shaped body is sintered in one of an atmosphere of an inert gas and an atmosphere of a gaseous mixture of nitrogen and oxygen.

Sintering the shaped body in an atmosphere of an inert gas can reduce or prevent the β-sialon's decomposition, microstructural variation, and the like. Furthermore, sintering the shaped body in an atmosphere of a gaseous mixture of nitrogen and oxygen allows a resultant sintered β-sialon to contain nitrogen and oxygen in a controlled amount.

The method of producing a torque transmission member for a universal joint, as described above, preferably, further includes the step of forming a surface of the shaped body before sintering the shaped body.

The shaped body that has been sintered is significantly increased in hardness and thus hard to work. Accordingly, for example sintering the shaped body and thereafter extensively working the shaped body to finish it as a torque transmission member for a universal joint invites an increased cost for producing the torque transmission member for the universal joint. In contrast, sintering the shaped body after working it to allow a finishing step or the like to be done such that the sintered shaped body is worked in a reduced amount allows a torque transmission member for a universal joint to be produced at a reduced cost. In particular, a production method adopting pressure sintering entails removing an anomaly layer, which entails working a sintered body in a relatively large amount. Thus, such a step does not have a large advantage. The present method of producing a torque transmission member for a universal joint adopts the step of sintering a shaped body formed of β-sialon at a pressure equal to or smaller than 1 MPa. This can reduce/eliminate an amount of working to remove an anomaly layer and the step is thus significantly beneficial.

The method of producing a torque transmission member for a universal joint, as described above, preferably further includes the step of working a surface of the sintered shaped body to remove a portion including the surface, and the step of working removes the shaped body by a thickness equal to or smaller than 150 μm.

The present method of producing a torque transmission member for a universal joint provides a portion including a surface with a higher density layer aforementioned, and having a thickness of approximately 150 μm. Accordingly, when a sintered shaped body is to have a surface worked to remove a portion including that surface, e.g., when the sintered shaped body undergoes a finishing step, the finishing step that is done to remove the shaped body by a thickness equal to or smaller than 150 μm allows the torque transmission member for the universal joint to have a contact surface with a higher density layer remaining therein. The step as described above allows a torque transmission member for a universal joint to be produced with further improved durability against rolling and sliding contact fatigue. Note that to ensure that the higher density layer remains, the step more preferably removes the sintered shaped body by a thickness equal to or smaller than 100 μm.

The present invention in one aspect provides a sliding member contacting another adjacent member and also sliding relative to the other member. The sliding member is configured of a sintered body that contains β-sialon as a main component and has a remainder formed of an impurity. The sliding member has a contact surface serving as a surface contacting the other member, and the contact surface is included in a portion having a high density layer higher in density than an inner portion.

The present invention in another aspect provides a sliding member contacting another adjacent member and also sliding relative to the other member. The sliding member is configured of a sintered body that contains β-sialon as a main component and has a remainder formed of a sintering additive and an impurity. The sliding member has a contact surface serving as a surface contacting the other member, and the contact surface is included in a portion having a high density layer higher in density than an inner portion.

The present inventor has investigated in detail a relationship between the wear resistance of a sliding member containing β-sialon as a main component and the sliding member's configuration, and as a result obtained the following finding and arrived at the present invention.

More specifically, when a sintered body containing β-sialon as a main component, as described above, is used to produce a sliding member, its density significantly affects wear resistance, one of the most important durability for the sliding member. The present sliding member is formed of a sintered body containing β-sialon as a main component and has a contact surface included in a portion having a high density layer higher in density than an inner portion. As a result the present invention can provide a sliding member formed of a sintered body containing as a main component a β-sialon that is inexpensive and capable of reliably ensuring sufficient durability as it achieves improved wear resistance.

Note that the sliding member in the other aspect of the present invention includes a sintering additive as the sliding member's application and the like are considered. This can facilitate providing a sintered body reduced in porosity. Thus the present invention can readily provide a sliding member formed of a sintered body containing as a main component a β-sialon that is inexpensive and capable of reliably ensuring sufficient durability as it achieves improved wear resistance.

Herein, a high density layer is a layer in a sintered body that is low in porosity (or high in density), and can be inspected for example as follows: Initially, the sliding member is cut along a cross section perpendicular to a surface of the sliding member and the cross section is mirror-lapped. The mirror-lapped cross section is then imaged through an optical microscope with oblique illumination (a dark field) at a magnification for example of approximately 50-100 times, and stored in an image equal to or larger than 300 dots per inch (DPI). In doing so, a portion that is white in color is observed as a white color portion, which corresponds to a portion high in porosity (or low in density). Accordingly, a portion having a white color portion having a small area ratio is higher in density than a portion having a white color portion having a large area ratio. An image processor is used to binarize the stored image by a brightness threshold value and a white color portion's area ratio is thus measured and therefrom the imaged portion's density can be obtained. In other words, the present sliding member has a contact surface included in a portion having a high density layer having a white color portion having a smaller area ratio than an inner portion does. Note that preferably the imaging is done randomly at least five locations and the area ratio is evaluated from an average value thereof. Furthermore, the sliding member at an inner portion has a white color portion having an area ratio for example equal to or larger than 15%.

Furthermore, to provide the sliding member with further increased wear resistance, it is preferable that the high density layer has a thickness equal to or larger than 100 μm. Furthermore the sintering additive adopted in the sliding member in another aspect as described above can be selected from at least one of an oxide, a nitride and an oxynitride of magnesium (Mg), aluminum (Al), silicon (Si), titanium (Ti) and a rare earth element. Furthermore, to achieve a function and effect equivalent to that of the sliding member in one aspect of the present invention, it is desirable that the sintering additive be equal to or smaller than 20% by mass of the sintered body.

In the above sliding member preferably when the high density layer is observed in cross section with an optical microscope with oblique illumination, the layer exhibits a portion observed as a portion white in color having an area ratio equal to or smaller than 7%.

The high density layer improved in density to an extent allowing a white color portion to have an area ratio equal to or smaller than 7% provides the sliding member with further increased wear resistance. The present sliding member can thus achieve further increased durability.

In the above sliding member preferably the high density layer has a surface included in a higher density layer higher in density than another portion of the high density layer.

A higher density layer further higher in density and provided at a portion including a surface of the high density layer can further enhance the sliding member's wear resistance.

In the above sliding member preferably when the higher density layer is observed in cross section with an optical microscope with oblique illumination, the layer exhibits a portion observed as a portion white in color having an area ratio equal to or smaller than 3.5%.

The higher density layer improved in density to an extent allowing a white color portion to have an area ratio equal to or smaller than 3.5% provides the sliding member with further increased wear resistance.

The present invention provides a sliding device including the present sliding member. The present sliding device that includes the present sliding member can be a sliding device including a sliding member formed of a sintered β-sialon inexpensive and capable of reliably ensuring sufficient durability.

The present invention in one aspect provides a method of producing a sliding member contacting another adjacent member and also sliding relative to the other member, comprising the steps of: preparing a powdery source material that contains β-sialon as a main component and has a remainder formed of an impurity; shaping the powdery source material generally into a geometry of the sliding member to provide a shaped body; and sintering the shaped body at a pressure equal to or smaller than 1 MPa.

The present invention in another aspect provides a method of producing a sliding member contacting another adjacent member and also sliding relative to the other member, comprising the steps of: preparing a powdery source material that contains β-sialon as a main component and has a remainder formed of a sintering additive and an impurity; shaping the powdery source material generally into a geometry of the sliding member to provide a shaped body; and sintering the shaped body at a pressure equal to or smaller than 1 MPa.

When a sintered body of ceramics is to be used to produce a sliding member, a method is generally employed that adopts hot isostatic press (HIP), gas pressured sintering (GPS), or similar pressure sintering (normally, a method sintering at a pressure equal to or larger than 10 MPa) to reduce or prevent a defect reducing the sliding member's wear resistance. This conventional production method can reduce the sliding member's porosity and thus produce a sliding member high in density. The conventional production method adopting pressure sintering, however, invites an increased production cost. Furthermore, the production method adopting pressure sintering alters the sliding member at a surface portion in material to cause an anomaly layer. This necessitates removing that anomaly layer in a process for finishing the sliding member, which further increases the sliding member's production cost. In contrast, if pressure sintering is not adopted, the sliding member's porosity is increased and a defect is thus caused and the sliding member's wear resistance is decreased.

The present inventor has found that sintering a shaped body that is formed of β-sialon at a pressure equal to or smaller than 1 MPa to produce a sliding member can provide the sliding member at a portion that includes a contact surface (a surface) that is formed at a surface thereof with a high density layer higher in density than an inner portion thereof. The present method of producing a sliding member that includes the step of sintering a shaped body that contains β-sialon as a main component at a pressure equal to or smaller than 1 MPa can provide a portion that includes a contact surface with a high density layer while reducing/eliminating an increased production cost associated with pressure sintering. Consequently the present method of producing a sliding member can inexpensively produce a sliding member formed of a sintered β-sialon capable of reliably ensuring sufficient durability.

Note that the step of sintering the shaped body is performed preferably at a pressure equal to or larger than 0.01 MPa to reduce or prevent decomposition of β-sialon, and more preferably at a pressure equal to or larger than the atmospheric pressure when cost reduction is considered. Furthermore, to provide the high density layer while reducing production cost, the step of sintering the shaped body is performed preferably at a pressure equal to or smaller than 1 MPa.

In the method of producing a sliding member, as described above, preferably, in the step of sintering the shaped body, the shaped body is sintered in a range of 1550° C. to 1800° C.

If the shaped body is sintered at a temperature less than 1550° C., it is not sintered to facilitate increasing it in density. Accordingly, the shaped body is sintered preferably at a temperature equal to or higher than 1550° C. and more preferably equal to or higher than 1600° C. In contrast, if the shaped body is sintered at a temperature exceeding 1800° C., the β-sialon may have coarse crystal grains resulting in a sintered body having poor mechanical characteristics. Accordingly, the shaped body is sintered preferably at a temperature equal to or lower than 1800° C. and more preferably equal to or lower than 1750° C.

In the method of producing a sliding member, as described above, preferably, in the step of sintering the shaped body, the shaped body is sintered in one of an atmosphere of an inert gas and an atmosphere of a gaseous mixture of nitrogen and oxygen.

Sintering the shaped body in an atmosphere of an inert gas can reduce or prevent the β-sialon's decomposition, microstructural variation, and the like. Furthermore, sintering the shaped body in an atmosphere of a gaseous mixture of nitrogen and oxygen allows a resultant sintered β-sialon to contain nitrogen and oxygen in a controlled amount.

The method of producing a sliding member, as described above, preferably, further includes the step of forming a surface of the shaped body before sintering the shaped body.

The shaped body that has been sintered is significantly increased in hardness and thus hard to work. Accordingly, for example sintering the shaped body and thereafter extensively working the shaped body to finish it as a sliding member invites an increased cost for producing the sliding member. In contrast, sintering the shaped body after working it to allow a finishing step or the like to be done such that the sintered shaped body is worked in a reduced amount allows a sliding member to be produced at a reduced cost. In particular, a production method adopting pressure sintering entails removing an anomaly layer, which entails working a sintered body in a relatively large amount. Thus, such a step does not have a large advantage. The present method of producing a sliding member adopts the step of sintering a shaped body that is formed of β-sialon at a pressure equal to or smaller than 1 MPa. This can reduce/eliminate an amount of working to remove an anomaly layer and the step is thus significantly beneficial.

The method of producing a sliding member, as described above, preferably further includes the step of working a surface of the sintered shaped body to remove a portion including the surface, and the step of working removes the shaped body by a thickness equal to or smaller than 150 μm.

The present method of producing a sliding member provides a portion including a surface with a higher density layer aforementioned, and having a thickness of approximately 150 μm. Accordingly, when a sintered shaped body is to have a surface worked to remove a portion including that surface, e.g., when the sintered shaped body undergoes a finishing step, the finishing step that is done to remove the shaped body by a thickness equal to or smaller than 150 μm allows the sliding member to have a contact surface with a higher density layer remaining therein. The step as described above allows a sliding member to be produced with further improved wear resistance. Note that to ensure that the higher density layer remains, the step more preferably removes the sintered shaped body by a thickness equal to or smaller than 100 μm.

EFFECTS OF THE INVENTION

As is apparent from the above description, the present rolling contact member, rolling bearing, and method of producing the rolling contact member can provide a rolling contact member formed of a sintered β-sialon inexpensive and capable of reliably ensuring sufficient durability, a method of producing the same, and a rolling bearing including the rolling contact member.

Furthermore, the present torque transmission member for a universal joint, the present universal joint, and the present method of producing the torque transmission member for the universal joint can provide a torque transmission member for a universal joint that is formed of a sintered β-sialon inexpensive and capable of reliably ensuring sufficient durability, a method of producing the same, and a universal joint that includes that torque transmission member for the universal joint.

Furthermore, the present sliding device, sliding member, and method of producing the same can provide a sliding member formed of a sintered β-sialon inexpensive and capable of reliably ensuring sufficient durability, a method of producing the same, and a sliding device including that sliding member.

DESCRIPTION OF THE REFERENCE SIGNS

Figure 1:
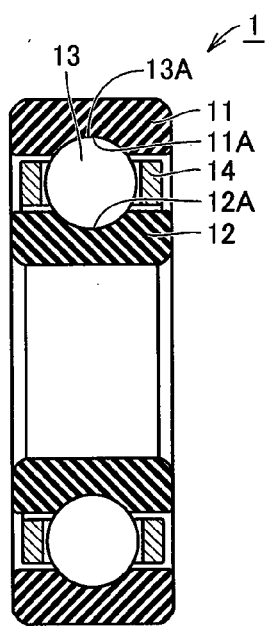
FIG. 1 is a schematic cross section of a configuration of a deep-grooved ball bearing in a first embodiment.

1: deep-grooved ball bearing, 2: thrust needle roller bearing, 3: hub unit, 11: outer ring, 11A: outer ring raceway surface, 11B: outer ring high density layer, 11C, 12C, 13C: inner portion, 11D: outer ring higher density layer, 12: inner ring, 12A: inner ring raceway surface, 12B: inner ring high density layer, 12D: inner ring higher density layer, 13: ball, 13A: ball rolling contact surface, 13B: ball high density layer, 13D: ball higher density layer, 14, 24, 39A, 39B: cage, 21: bearing washer, 21A: bearing washer raceway surface, 21B: bearing washer high density layer, 21C, 23C: inner portion, 21D: bearing washer higher density layer, 23: needle roller, 23A: roller rolling contact surface, 23B: roller high density layer, 23D: roller higher density layer, 31: outer ring, 31A1, 31A2, 32A, 33A: raceway surface, 31B: outer ring high density layer, 31C, 32C, 33C, 34C: inner portion, 31D: outer ring higher density layer, 32: hub ring, 32B: hub ring high density layer, 32D: hub ring higher density layer, 33: inner ring, 33B: inner ring high density layer, 33D: inner ring higher density layer, 34: ball, 34A: ball rolling contact surface, 34B: ball high density layer, 34D: ball higher density layer, 35: hub ring flange, 35A: hub ring through hole, 36: bolt, 37: outer ring flange, 37A: outer ring through hole, 38: fixing ring, 101: fixed joint, 102: tripod joint, 111: inner race, 111A: inner race ball groove, 112: outer race, 112A: outer race ball groove, 113: ball, 113A: ball rolling contact surface, 113B: ball high density layer, 113C: inner portion, 113D: ball higher density layer, 114: cage, 115, 116: shaft, 121: tripod, 211: tripod shaft, 122: outer race, 122A: outer race groove, 123: spherical roller, 123A: spherical roller rolling contact surface, 123B: spherical roller high density layer, 123C: inner portion, 123D: spherical roller higher density layer, 125, 126: shaft, 129: needle roller, 301: spherical plain bearing, 302: fluid dynamic bearing unit, 303: spindle motor, 311: outer ring 311A: outer ring sliding surface, 311B: outer ring high density layer, 311C, 312C: inner portion, 311D: outer ring higher density layer, 312: inner ring, 312A: inner ring sliding surface, 312B: inner ring high density layer, 312D: inner ring higher density layer, 321: shaft portion, 321A: shaft portion contact surface, 321B: shaft portion high density layer, 321C, 322C, 324C, 325C: inner portion, 321D: shaft portion higher density layer, 322: flange portion, 322A: flange portion contact surface, 322B: flange portion high density layer, 322D: flange portion higher density layer, 324: bottom wall portion, 324A: bottom wall portion contact surface, 324B: bottom wall portion high density layer, 324D: bottom wall portion higher density layer, 325: side wall portion, 325A: side wall portion contact surface, 325B: side wall portion high density layer, 325D: side wall portion higher density layer, 327: bearing member, 328: shaft member, 329: bearing, 332: motor stator, 333: motor rotor, 334: disc hub.

BEST MODES FOR CARRYING OUT THE INVENTION

Hereinafter reference will be made to the drawings to describe the present invention in embodiments. In the figures, identical or corresponding components are identically denoted and will not be described repeatedly.

First Embodiment

Initially reference will be made to FIG. 1 and FIG. 2 to describe a deep-grooved ball bearing implementing a rolling bearing in a first embodiment.

With reference to FIG. 1, a deep-grooved ball bearing 1 includes a race member implemented as an annular outer ring 11, a race member implemented as an annular inner ring 12 arranged to be inner than outer ring 11, and rolling elements implemented as a plurality of balls 13 arranged between outer and inner rings 11 and 12 and held in an annular cage 14. Outer ring 11 has an inner circumferential surface having an outer ring raceway surface 11A and inner ring 12 has an outer circumferential surface having an inner ring raceway surface 12A. Outer ring 11 and inner ring 12 are disposed such that inner ring raceway surface 12A and outer ring raceway surface 11A face each other. The plurality of balls 13 are held in a rollable manner on an annular raceway, with their rolling contact surfaces 13A in contact with inner ring raceway surface 12A and outer ring raceway surface 11A, disposed at a predetermined pitch in the circumferential direction by means of cage 14. By such a configuration, outer ring 11 and inner ring 12 of deep-grooved ball bearing 1 can be rotated relative to each other.

Figure 2:
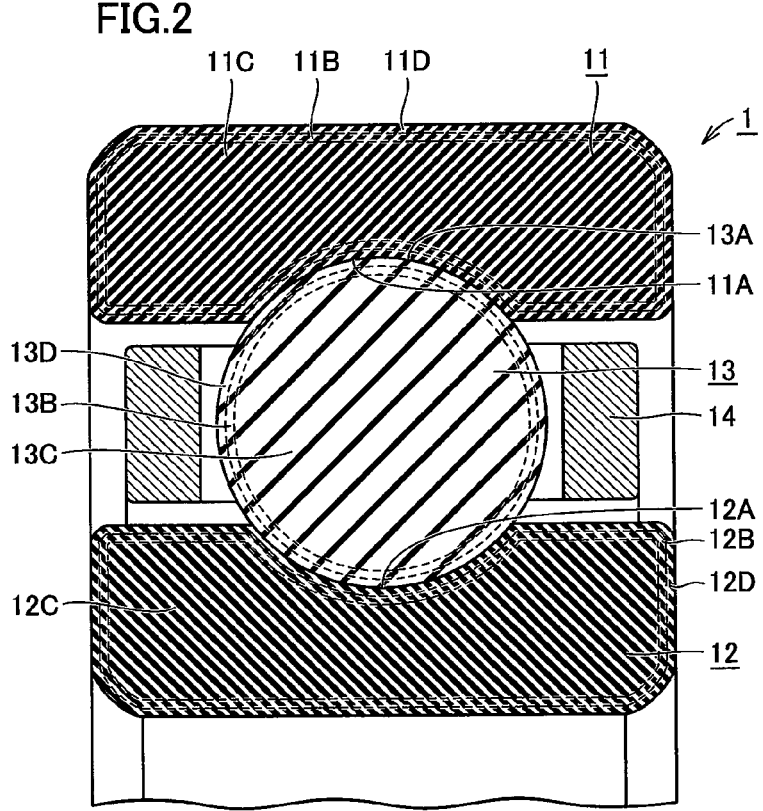
FIG. 2 is an enlarged schematic partial cross section of a main portion of FIG. 1.

Herein, with reference to FIG. 2, the present embodiment provides a rolling contact member implemented as outer ring 11, inner ring 12 and ball 13 configured of a sintered body that contains β-sialon as a main component and has a remainder formed of an impurity. Furthermore, outer ring 11, inner ring 12 and ball 13 have outer ring raceway surface 11A, inner ring raceway surface 12A and ball rolling contact surface 13A, respectively, included in a portion provided with an outer ring high density layer 11B, an inner ring high density layer 12B and a ball high density layer 13B higher in density than inner portions 11C, 12C, 13C. When outer ring high density layer 11B, inner ring high density layer 12B and ball high density layer 13B are observed in cross section with an optical microscope with oblique illumination, they exhibit a portion white in color, hereinafter also referred to as a white color portion, having an area ratio equal to or smaller than 7%. The present embodiment thus provides deep-grooved ball bearing 1 that serves as a rolling bearing including a rolling contact member (outer ring 11, inner ring 12 and ball 13) formed of a sintered β-sialon inexpensive and capable of reliably ensuring sufficient durability. The impurity includes an unavoidably introduced impurity including those derived from a source material or entering during the production process.

Note that in the present embodiment the rolling contact member implemented as outer ring 11, inner ring 12 and ball 13 may be configured of a sintered body that contains β-sialon as a main component and has a remainder formed of a sintering additive and an impurity. The sintering additive helps to reduce the sintered body in porosity and hence provide a rolling bearing including a rolling contact member formed of a sintered β-sialon capable of reliably ensuring sufficient durability. The impurity includes an unavoidably introduced impurity including those derived from a source material or entering during the production process.

Furthermore, with reference to FIG. 2, outer ring high density layer 11B, inner ring high density layer 12B and ball high density layer 13B have surfaces, or outer ring raceway surface 11A, inner ring raceway surface 12A and ball rolling contact surface 13A, respectively, included in a portion provided with an outer ring higher density layer 11D, an inner ring higher density layer 12D and a ball higher density layer 13D further higher in density than another portion of outer ring high density layer 11B, inner ring high density layer 12B and ball high density layer 13B. When outer ring higher density layer 11D, inner ring higher density layer 12D and ball higher density layer 13D are observed in cross section with an optical microscope with oblique illumination, they exhibit a white color portion having an area ratio equal to or smaller than 3.5%. Outer ring 11, inner ring 12 and ball 13 are thus further improved in durability against rolling contact fatigue and thus achieve further improved rolling contact fatigue life.

Hereinafter reference will be made to FIG. 3 to FIG. 5 to describe a thrust needle roller bearing serving as a rolling bearing in an exemplary variation of the first embodiment.

Figure 3:
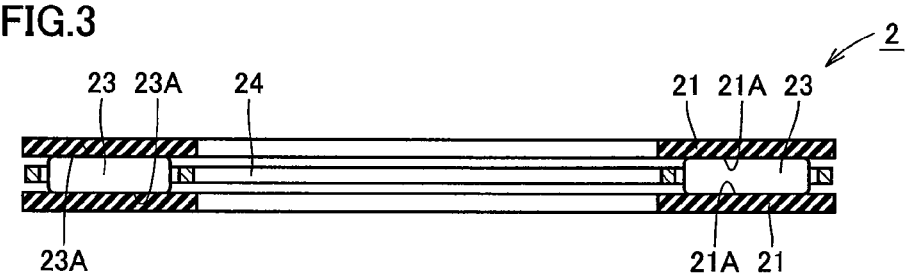
FIG. 3 is a schematic cross section of a configuration of a thrust needle roller bearing in an exemplary variation of the first embodiment.
Figure 4:
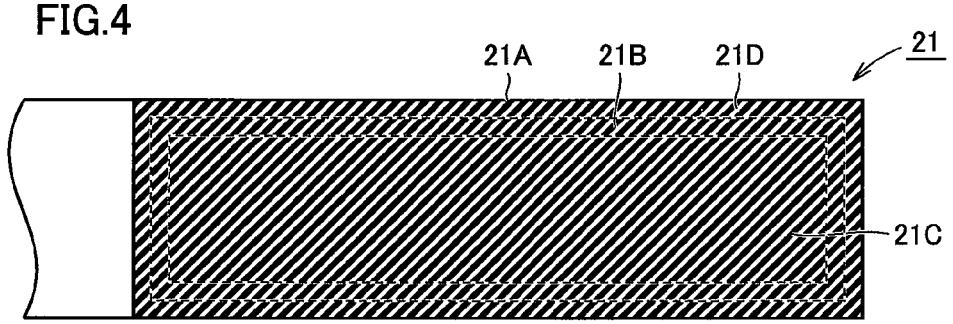
FIG. 4 is an enlarged schematic partial cross section of a main portion of a bearing washer that the FIG. 3 thrust needle roller bearing includes.
Figure 5:
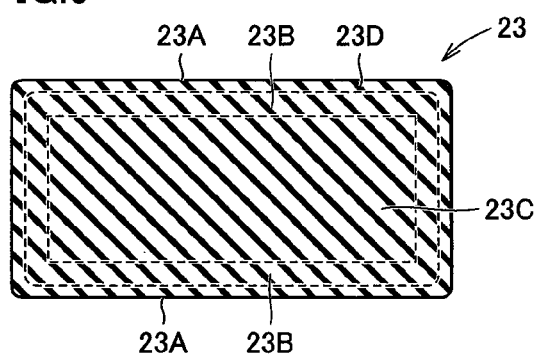
FIG. 5 is an enlarged schematic partial cross section of a needle roller that the FIG. 3 thrust needle roller bearing includes.

With reference to FIG. 3 to FIG. 5, a thrust needle roller bearing 2 is basically similar in configuration and effect to deep-grooved ball bearing 1 described with reference to FIG. 1, except that the former includes a race member and a rolling element different in configuration than the latter. More specifically, thrust needle roller bearing 2 includes a pair of bearing washers 21 in the form of a disk, serving as a race member arranged such that their respective, one main surfaces face each other, a plurality of needle rollers 23 serving as a rolling element, and an annular cage 24. The plurality of needle rollers 23 are held in a rollable manner on an annular raceway, with their respective outer circumferential surfaces or rolling contact surfaces 23A in contact with bearing washer raceway surface 21A formed at the main surfaces of the pair of bearing washers 21 facing each other, disposed at a predetermined pitch in the circumferential direction by means of cage 24. By such a configuration, the pair of bearing washers 21 of thrust needle roller bearing 2 can be rotated relative to each other.

Herein in the present exemplary variation the rolling contact member implemented as bearing washer 21 and needle roller 23 correspond to outer ring 11 or inner ring 12, and ball 13, as described above, respectively, and have similar inner portions 21C, 23C, a high density layer (a bearing washer high density layer 21B, a roller high density layer 23B), and a higher density layer (a bearing washer higher density layer 21D, a roller higher density layer 23D). Thus the present exemplary variation provides thrust needle roller bearing 2 that is a rolling bearing including a rolling element (bearing washer 21, needle roller 23) formed of a sintered β-sialon inexpensive and capable of reliably ensuring sufficient durability.

Hereinafter will be described a method of producing a rolling bearing in the first embodiment serving as one embodiment of the present invention.

Figure 6:
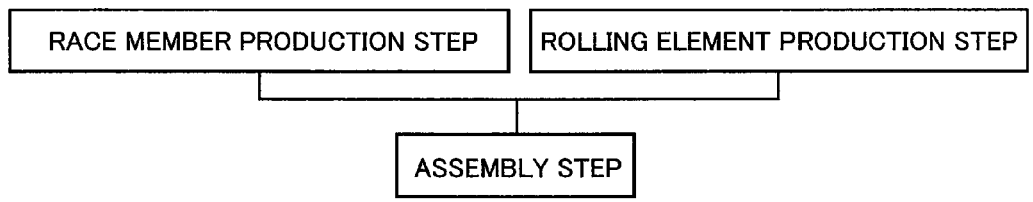
FIG. 6 generally represents a method of producing a rolling bearing in the first embodiment.

With reference to FIG. 6, in the present embodiment, a rolling bearing is produced in a method, as follows: Initially, a race member is produced in a race member production step and a rolling element is produced in a rolling element production step. More specifically the race member production step is performed to produce outer ring 11, inner ring 12, bearing washer 21 and the like. The rolling element production step is performed to produce ball 13, needle roller 23 and the like.

Then an assembly step is performed to combine the race member produced in the race member production step and the rolling element produced in the rolling element production step together to assemble a rolling bearing. More specifically, for example, outer ring 11 and inner ring 12, and ball 13 are combined together to assemble deep-grooved ball bearing 1. The race member production step and the rolling element production step are performed for example in accordance with a method of producing a rolling contact member, as will be described hereinafter.

Figure 7:
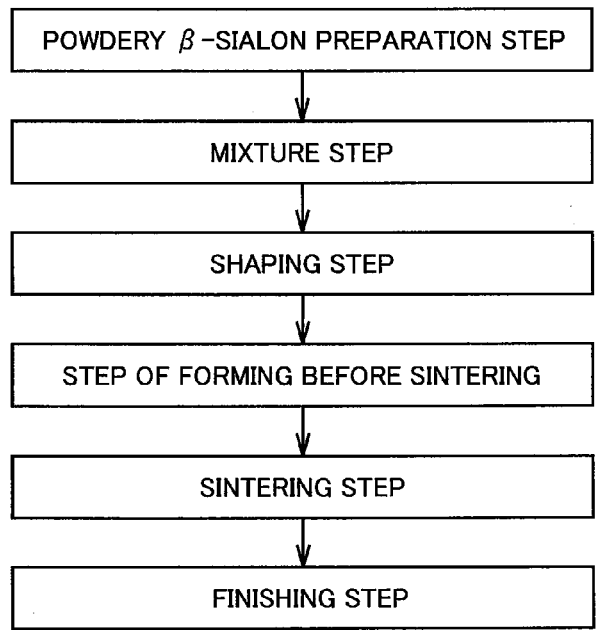
FIG. 7 generally represents a method of producing a rolling contact member, as included in a method of producing a rolling bearing in the first embodiment.

With reference to FIG. 7, in the present embodiment, a rolling contact member is produced in a method, as follows: Initially, powdery β-sialon is prepared in a powdery β-sialon preparation step. The powdery β-sialon preparation step can be performed for example with combustion synthesis adopted in a production step to produce powdery β-sialon inexpensively.

A mixture step is then performed to add a sintering additive to the powdery β-sialon prepared in the powdery β-sialon preparation step and mix them together. The mixture step can be eliminated if the sintering additive is not added.

Then, with reference to FIG. 7, a shaping step is performed to shape the powdery β-sialon or the mixture of the powdery β-sialon and the sintering additive generally into the geometry of the rolling contact member. More specifically, the powdery β-sialon or the mixture of the powdery β-sialon and the sintering additive is press-formed, cast-molded, extrusion-formed, rolling-granulated, or similarly shaped to provide a body shaped generally into the geometry of the rolling contact member implemented as outer ring 11, inner ring 12, ball 13, bearing washer 21, needle roller 23 and the like.

The step of forming before sintering is then performed to form a surface of the shaped body to allow the shaped body that has been sintered to have a geometry closer to that of a rolling contact member as desired. More specifically, green body forming or a similar forming technique is used to shape the shaped body so that the shaped body having been sintered can have a geometry closer to that of outer ring 11, inner ring 12, ball 13, bearing washer 21, needle roller 23 or the like. The step of forming before sintering can be eliminated if the shaping step provides a shaped body in a condition allowing the shaped body that has been sintered to have a geometry close to that of a rolling contact member as desired.

Then, with reference to FIG. 7, a sintering step is performed to sinter the shaped body at a pressure equal to or smaller than 1 MPa. More specifically, the shaped body is heated with a heater, a microwave, a millimeter wave or a similar electromagnetic wave and thus sintered to provide a sintered body generally having a geometry of outer ring 11, inner ring 12, ball 13, bearing washer 21, needle roller 23 or the like. The shaped body is sintered by being heated in an atmosphere of an inert gas or that of a gaseous mixture of nitrogen and oxygen to a range of 1550° C. to 1800° C. The inert gas can be helium, neon, argon, nitrogen or the like. In view of production cost reduction, nitrogen is preferably adopted.

Then the sintered body produced in the sintering step has a surface worked to remove a portion including that surface, i.e., it is worked for finish, to complete a rolling contact member, i.e., a finishing step is performed. More specifically, the sintered body produced in the sintering step has a surface polished to complete a rolling contact member implemented as outer ring 11, inner ring 12, ball 13, bearing washer 21, needle roller 23 and the like. Through the above steps the rolling contact member in the present embodiment completes.

Herein, the sintering step provides a sintered body having at a portion from its surface to a depth of approximately 500 μm a high density layer higher in density than an inner portion and having a portion white in color, or a white color portion, as observed in cross section with an optical microscope with oblique illumination, having an area ratio equal to or smaller than 7%. Furthermore, the sintered body has at a portion from its surface to a depth of approximately 150 μm a higher density layer further higher in density than another portion of the high density layer and having a portion white in color, or a white color portion, as observed in cross section with an optical microscope with oblique illumination, having an area ratio equal to or smaller than 3.5%. Accordingly in the finishing step the sintered body is removed preferably by a thickness equal to or smaller than 150 μm in a portion that should serve as a raceway/rolling contact surface in particular. This allows the higher density layer to remain in a portion including outer ring raceway surface 11A, inner ring raceway surface 12A, ball rolling contact surface 13A, bearing washer raceway surface 21A and roller rolling contact surface 23A to provide the rolling contact member with improved rolling contact fatigue life.

Second Embodiment

Figure 8:
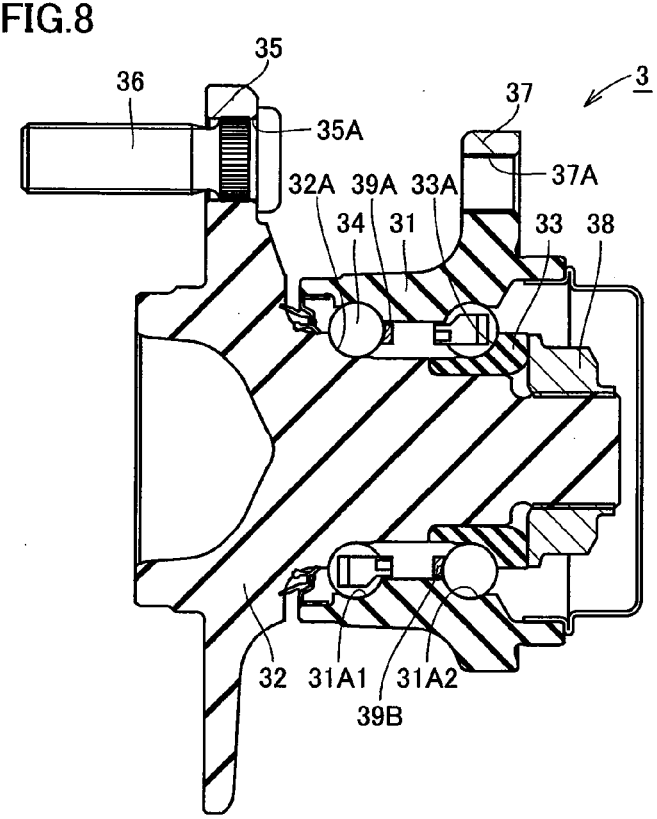
FIG. 8 is a schematic cross section of a configuration of a hub unit in a second embodiment.
Figure 9:
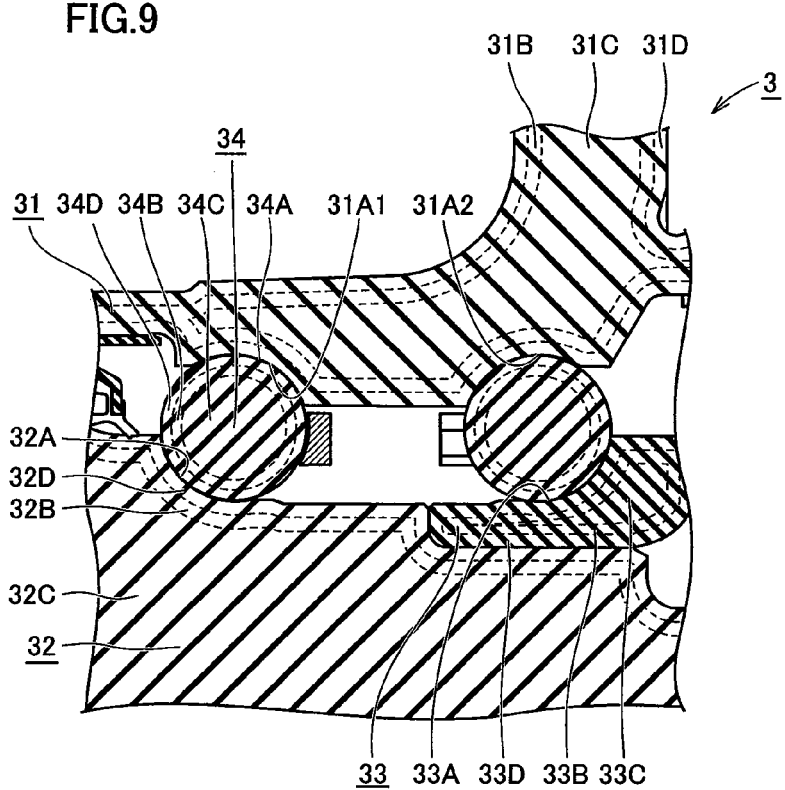
FIG. 9 is an enlarged schematic partial cross section of a main portion of FIG. 8.

With reference to FIGS. 8 and 9, a second embodiment provides a hub unit, as will be described hereinafter.

With reference to FIG. 8 and FIG. 9, a hub unit 3 is basically similar in configuration and effect to deep-grooved ball bearing 1 described with reference to FIG. 1, except that the former includes a race member and a rolling element different in configuration than the latter. More specifically, hub unit 3 is a device posed between a vehicular wheel and a vehicular body and rotatably supporting the wheel relative to the body.

Hub unit 3 includes a race member implemented as an outer ring 31, a hub ring 32 and an inner ring 33, and a rolling element implemented as a plurality of balls 34.

Outer ring 31, serving as an outer member, is an annular race member having an inner circumferential surface provided with two rows of raceway surfaces 31A1, 31A2. Hub ring 32, serving as an inner member, is a race member having a raceway surface 32A opposite to one raceway surface 31A1 of outer ring 31 and disposed to have a portion surrounded by outer ring 31. Furthermore, inner ring 33, serving as an inner member, is an annular race member that has a raceway surface 33A opposite to the other raceway surface 31A2 of outer ring 31, and is fitted in contact with a portion of an outer circumferential surface of hub ring 32, and fixed to hub ring 32 by a fixing ring 38 fitted in contact with a portion of an outer circumferential surface of hub ring 32.

The plurality of balls 34 are rotatably arranged on an annular raceway of a plurality of (two) rows. One row is in contact with one raceway surface 31A1 of outer ring 31 and raceway surface 32A of hub ring 32 and arranged by an annular cage 39A in a circumferential direction at a predetermined pitch. The other row is in contact with the other raceway surface 31A2 of outer ring 31 and raceway surface 33A of inner ring 33 and arranged by an annular cage 39B in a circumferential direction at a predetermined pitch. The outer member implemented as outer ring 31 and the inner member implemented as hub ring 32 and inner ring 33 can thus rotate relative to each other.

Furthermore, hub ring 32 has a hub ring flange 35 having a hub ring through hole 35A. Hub ring through hole 35A receives a bolt 36 to fix hub ring flange 35 and a vehicular wheel (not shown) to each other. Outer ring 31 has an outer ring flange 37 having an outer ring through hole 37A. Outer ring through hole 37A receives a bolt (not shown) to fix outer ring flange 37 and a suspension device (not shown) that is fixed to the vehicular body to each other. Thus hub unit 3 is posed between the vehicular wheel and the vehicular body to support the wheel relative to the body rotatably.

In other words, the present embodiment provides hub unit 3 that is a hub unit posed between a vehicular wheel and a vehicular body to support the wheel relative to the body rotatably. Hub unit 3 includes: an outer member implemented as outer ring 31 having an inner circumferential surface provided with annular raceway surface 31A1, 31A2; an inner member implemented as hub ring 32 provided with annular raceway surface 32A opposite to raceway surface 31A1 of outer ring 31 and disposed with at least a portion thereof surrounded by an inner circumferential surface of outer ring 31; and an inner member implemented as inner ring 33 provided with annular raceway surface 33A opposite to raceway surface 31A2 of outer ring 31 and disposed with at least a portion thereof surrounded by an inner circumferential surface of outer ring 31. Furthermore, hub unit 3 includes a plurality of balls 34 arranged on an annular raceway and in contact at a ball rolling contact surface 34A with outer ring 31 at raceway surfaces 31A1, 31A2 and hub ring 32 and inner ring 33 at raceway surfaces 32A, 33A.

Herein, with reference to FIG. 8 and FIG. 9, the present embodiment provides a rolling contact member implemented as outer ring 31, hub ring 32 and inner ring 33, and ball 34, which correspond respectively to outer ring 11 and inner ring 12, and ball 13 of the first embodiment and similarly have inner portions 31C, 32C, 33C, 34C, a high density layer (an outer ring high density layer 31B, a hub ring high density layer 32B, an inner ring high density layer 33B, a ball high density layer 34B) and a higher density layer (an outer ring higher density layer 31D, a hub ring higher density layer 32D, an inner ring higher density layer 33D, a ball higher density layer 34D). Thus the present embodiment provides hub unit 3 that is a rolling bearing including a rolling contact member (outer ring 31, hub ring 32, inner ring 33, ball 34) formed of a sintered β-sialon inexpensive and capable of reliably ensuring sufficient durability. Note that the rolling bearing implemented in the second embodiment as hub unit 3 and the rolling contact member implemented in the same embodiment as outer ring 31, hub ring 32, inner ring 33, ball 34 that hub unit 3 includes in the same embodiment can be produced similarly as they are produced in the first embodiment.

In the above embodiments the present rolling bearing and rolling contact member are exemplified by a deep-grooved ball bearing, a thrust needle roller bearing and a hub unit, and a rolling contact member that they include. The present rolling bearing, however, is not limited thereto. For example, the race member may be a shaft, a plate, or the like allowing a rolling element to roll on a surface thereof. In other words, the present rolling contact member corresponding to the race member may be any member that has a raceway surface for rolling a rolling element. Furthermore, the present rolling bearing may be a thrust ball bearing or may be a radial roller bearing.

Furthermore, the above embodiment has been described for the present rolling bearing including a race member and a rolling element both formed of β sialon to provide the present rolling contact member. The present rolling bearing is, however, not limited thereto. The present rolling bearing may have at least one of the race member and the rolling element corresponding to the present rolling contact member. If in the present rolling bearing one of the race member and the rolling element is the present rolling contact member, it is preferable that the rolling element be the present rolling contact member, considering the cost for producing the rolling bearing.

The present rolling bearing may have its race member formed of a material which is not particularly limited. It may for example be steel, more specifically, Japanese Industrial Standard (JIS) SUJ2 or a similar bearing steel, SCR420, SCM420 or a similar carburizing steel. Furthermore, the present rolling bearing may have its race member formed of a material of ceramics such as silicon nitride.

Third Embodiment

With reference to FIG. 10 to FIG. 14, the present invention in a third embodiment provides a universal joint implemented as a fixed joint. Note that FIG. 10 corresponds to a schematic cross section taken along a line X-X shown in FIG. 11.

Figure 10:
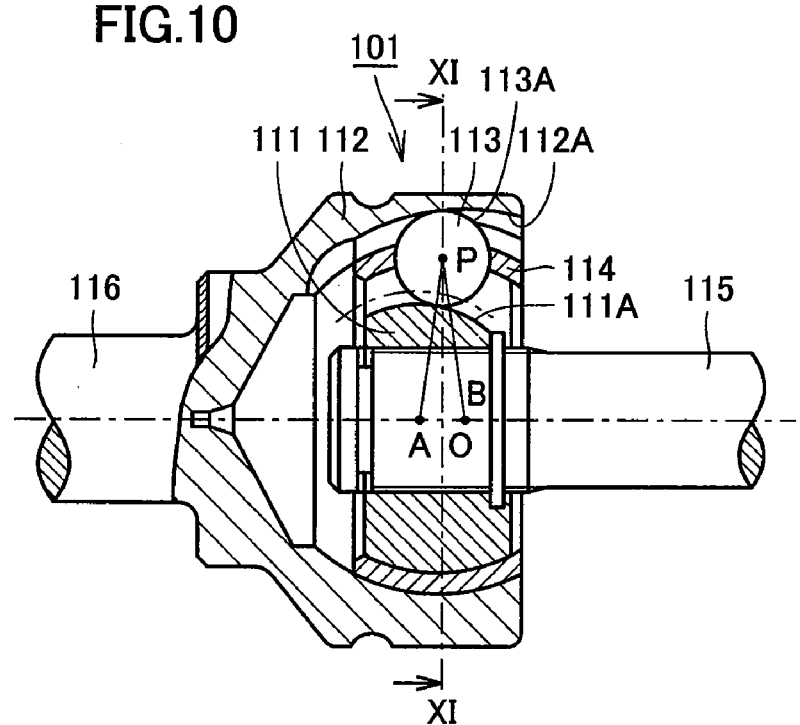
FIG. 10 is a schematic cross section of a configuration of a constant velocity joint (a fixed joint) in a third embodiment.

With reference to FIG. 10, the third embodiment provides a fixed joint 101 including a race member implemented as an inner race 111 coupled to a second shaft implemented as a shaft 115, a race member implemented as an outer race 112 arranged to surround the outer circumferential side of inner race 111 and coupled to a first shaft implemented as a shaft 116, a torque transmission member implemented as a ball 113 arranged between inner race 111 and outer race 112, and a cage 114 holding ball 113. Ball 113 is arranged with a surface, or a ball rolling contact surface 113A, in contact with an inner race ball groove 111A formed at the outer circumferential surface of inner race 111 and an outer race ball groove 112A formed at the inner circumferential surface of outer race 112, and is held by cage 114 to avoid falling off.

As shown in FIG. 10, inner race ball groove 111A and outer race ball groove 112A located at the outer circumferential surface of inner race 111 and the inner circumferential surface of outer race 112, respectively, are formed in a curve (arc) with points A and B equally spaced apart at the left and right on the axis passing through the center of shafts 115 and 116 in a straight line from the joint center O on the axis as the center of curvature. In other words, inner race ball groove 111A and outer race ball groove 112A are formed such that the trajectory of center P of ball 113 that rolls in contact with inner race ball groove 111A and outer race ball groove 112A corresponds to a curve (arc) with point A (inner race center A) and point B (outer race center B) as the center of curvature. Accordingly, ball 113 is constantly located on the bisector of an angle (∠ AOB) with respect to the axis passing through the center of shafts 115 and 116 even when the fixed joint forms an angle (when the fixed joint operates such that the axes passing through the center of shafts 115 and 116 cross).

Figure 11:
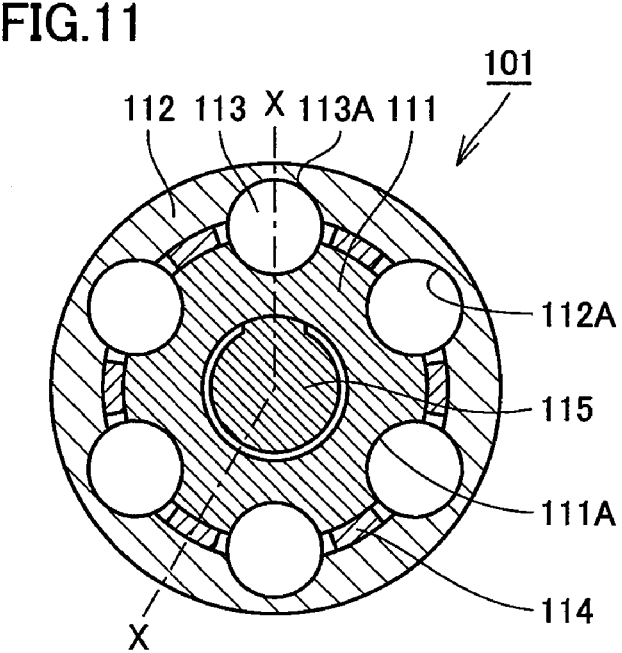
FIG. 11 is a schematic cross section taken along a line XI-XI shown in FIG. 10.

Fixed joint 101 operates, as will be described hereinafter. With reference to FIGS. 10 and 11, when the rotation about the axis is transmitted to one of shafts 115 and 116 at fixed joint 101, this rotation is transmitted to the other of shafts 115 and 116 via ball 113 fitted in inner race ball groove 111A and outer race ball groove 112A.

Figure 12:
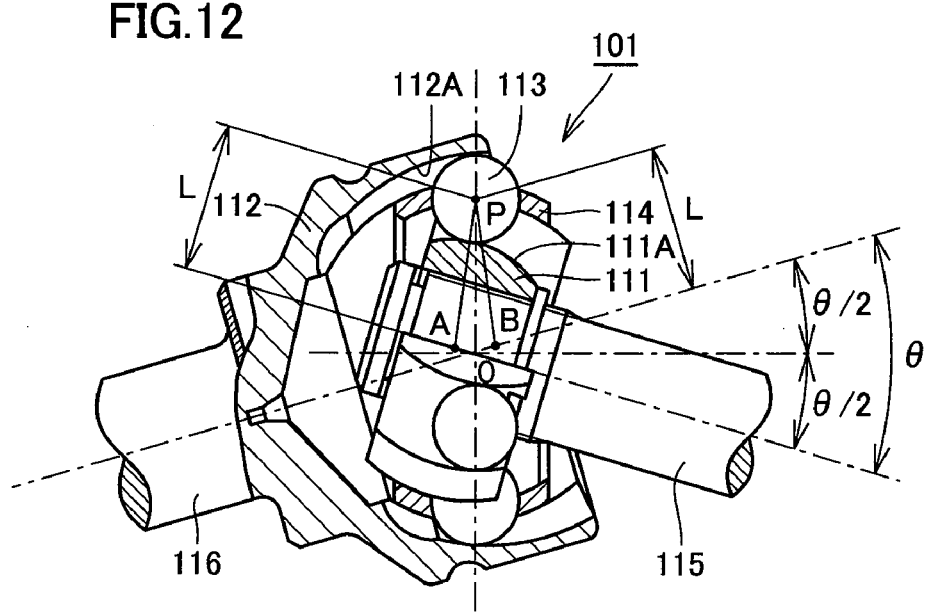
FIG. 12 is a schematic cross section of the FIG. 10 fixed joint forming an angle.

In the case where shafts 115 and 116 form an angle θ as shown in FIG. 12, ball 113 is guided by inner race ball groove 111A and outer race ball groove 112A with inner race center A and outer race center B as the center of curvature to be held at a position where its center P is located on the bisector of ∠ AOB. Since inner race ball groove 111A and outer race ball groove 112A are formed such that the distance from joint center O to inner race center A is equal to the distance from joint center O to outer race center B, the distance from center P of ball 113 to respective inner race center A and outer race center B is equal. Thus, triangle OAP is congruent to triangle OBP. As a result, the distances L from center P of ball 113 to shafts 115 and 116 are equal to each other, and when one of shafts 115 and 116 rotates about the axis, the other also rotates at constant velocity. Thus, fixed joint 101 can ensure constant velocity even in the state where shafts 115 and 116 constitute an angle. Cage 114 serves, together with inner race ball groove 111A and outer race ball groove 112A, to prevent ball 113 from jumping out of inner race ball groove 111A and outer race ball groove 112A when shafts 115 and 116 rotate, and also to determine joint center O of fixed joint 101.

In other words the third embodiment provides fixed joint 101 serving as a universal joint, including a race member implemented as outer race 112 connected to a first shaft member implemented as shaft 116, a torque transmission member implemented as ball 113 arranged in contact with outer race 112 and rollably and slidably on a surface of outer race ball groove 112A formed in outer race 112, and a second shaft member implemented as shaft 115 connected to shaft 116 via ball 113 and outer race 112. Furthermore, fixed joint 101 is a universal joint transmitting the rotation transmitted to one of shaft 116 and shaft 115 about an axis to the other of shaft 116 and shaft 115.

Furthermore, ball 13 is a torque transmission member for a universal joint, that is provided in the universal joint implemented as fixed joint 101, and is posed rollably and slidably between a race member implemented as outer race 112 connected to a first shaft member implemented as shaft 116 and a second shaft member implemented as shaft 115 and transmits the rotation transmitted to one of shaft 116 and shaft 115 about an axis to the other of shaft 116 and shaft 115.

Figure 13:
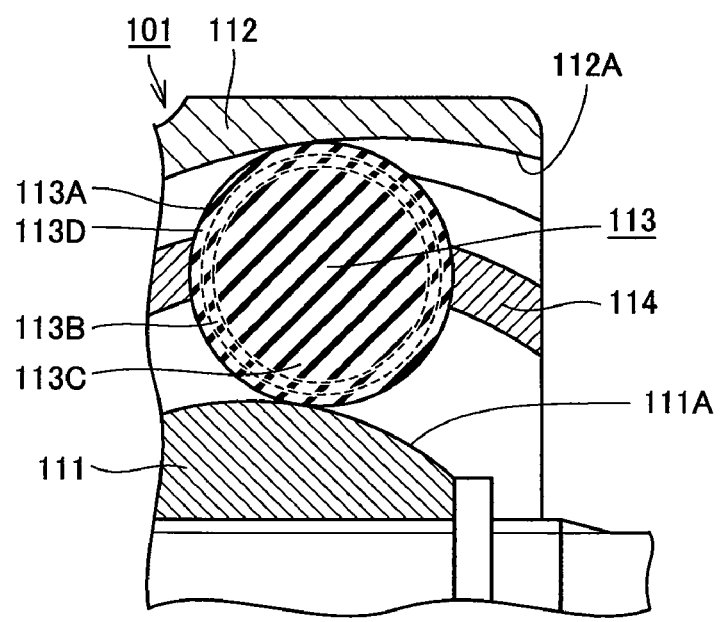
FIG. 13 is an enlarged schematic partial cross section of a main portion of FIG. 10.
Figure 14:
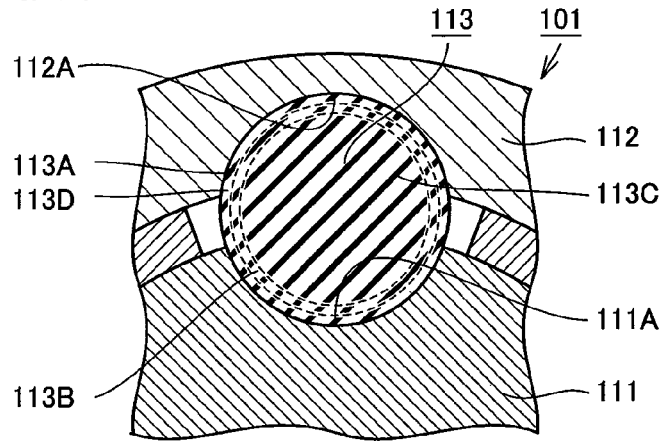
FIG. 14 is an enlarged schematic partial cross section of a main portion of FIG. 11.

Herein, with reference to FIG. 13 and FIG. 14, the present embodiment provides a torque transmission member for a universal joint, implemented as ball 113, which is configured of a sintered body that contains β-sialon as a main component and has a remainder formed of an impurity. Furthermore, ball 113 has a rolling contact surface, indicated as a ball rolling contact surface 113A, included in a portion provided with a ball high density layer 113B higher in density than an inner portion 113C. When ball high density layer 113B is observed in cross section with an optical microscope with oblique illumination, it exhibits a portion white in color, hereinafter also referred to as a white color portion, having an area ratio equal to or smaller than 7%. The present embodiment thus provides fixed joint 101 that serves as a universal joint including a torque transmission member (ball 113) formed of a sintered β-sialon inexpensive and capable of reliably ensuring sufficient durability for the universal joint. The impurity includes an unavoidably introduced impurity including those derived from a source material or entering during the production process.

Note that in the present embodiment the torque transmission member implemented as ball 113 for a universal joint may be configured of a sintered body that contains β-sialon as a main component and has a remainder formed of a sintering additive and an impurity. The sintering additive helps to reduce the sintered body in porosity and hence provide a universal joint including a torque transmission member formed of a sintered β-sialon capable of reliably ensuring sufficient durability for the universal joint. The impurity includes an unavoidably introduced impurity including those derived from a source material or entering during the production process.

Furthermore, with reference to FIG. 13 and FIG. 14, ball high density layer 113B has a surface, or ball rolling contact surface 113A, included in a portion provided with a ball higher density layer 113D further higher in density than another portion of ball high density layer 113B. When ball higher density layer 113D is observed in cross section with an optical microscope with oblique illumination, it exhibits a white color portion having an area ratio equal to or smaller than 3.5%. Ball 113 is thus further improved in durability against rolling and sliding contact fatigue.

Hereinafter will be described a method of producing a torque transmission member for a universal joint and the universal joint in the third embodiment serving as one embodiment of the present invention.

Figure 15:
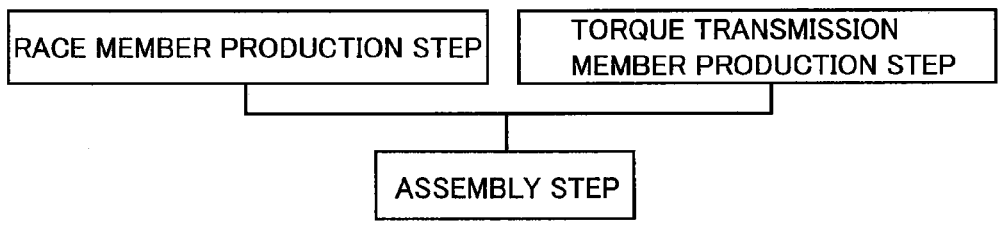
FIG. 15 generally represents a method of producing a universal joint in the third embodiment.

With reference to FIG. 15, in the present embodiment, a universal joint is produced in a method, as follows: Initially, a race member is produced in a race member production step and a torque transmission member is produced in a torque transmission member production step. More specifically the race member production step is performed to produce inner race 111, outer race 112 and the like. The torque transmission member production step is performed to produce ball 113 and the like.

Then an assembly step is performed to combine the race member produced in the race member production step and the torque transmission member produced in the torque transmission member production step together to assemble a universal joint. More specifically, for example, inner race 111 and outer race 112, ball 113, and cage 114 separately prepared and other components are combined together to assemble fixed joint 101. The torque transmission member production step is performed for example in accordance with a method of producing a torque transmission member for a universal joint, as will be described hereinafter.

Figure 16:
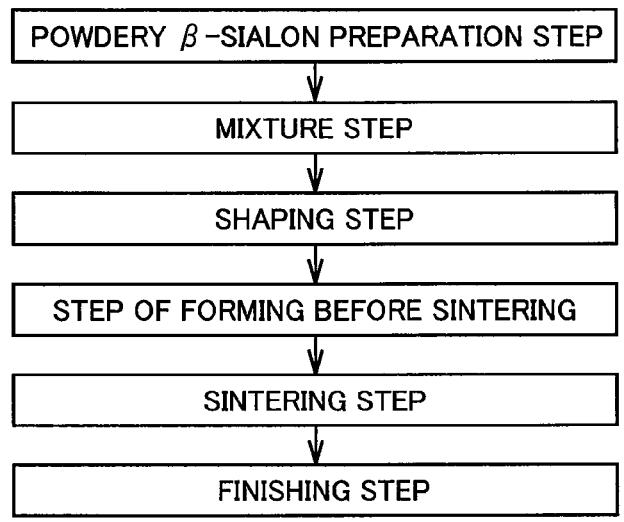
FIG. 16 generally represents a method of producing a torque transmission member for a universal joint, as included in a method of producing a universal joint in the third embodiment.

With reference to FIG. 16, in the present embodiment, a torque transmission member for a universal joint is produced in a method, as follows: Initially, powdery β-sialon is prepared in a powdery β-sialon preparation step. The powdery β-sialon preparation step can be performed for example with combustion synthesis adopted in a production step to produce powdery β-sialon inexpensively.

A mixture step is then performed to add a sintering additive to the powdery β-sialon prepared in the powdery β-sialon preparation step and mix them together. The mixture step can be eliminated if the sintering additive is not added.

Then, with reference to FIG. 16, a shaping step is performed to shape the powdery β-sialon or the mixture of the powdery β-sialon and the sintering additive generally into the geometry of the torque transmission member for the universal joint. More specifically, the powdery β-sialon or the mixture of the powdery β-sialon and the sintering additive is press-formed, cast-molded, extrusion-formed, rolling-granulated, or similarly shaped to provide a body shaped generally into the geometry of the torque transmission member implemented as ball 113 or the like for the universal joint.

The step of forming before sintering is then performed to form a surface of the shaped body to allow the shaped body that has been sintered to have a geometry closer to that of a torque transmission member as desired for a universal joint. More specifically, green body forming or a similar forming technique is used to shape the shaped body so that the shaped body having been sintered can have a geometry closer to that of ball 113 or the like. The step of forming before sintering can be eliminated if the shaping step provides a shaped body in a condition allowing the shaped body that has been sintered to have a geometry close to that of a torque transmission member as desired for a universal joint.

Then, with reference to FIG. 16, a sintering step is performed to sinter the shaped body at a pressure equal to or smaller than 1 MPa. More specifically, the shaped body is heated with a heater, a microwave, a millimeter wave or a similar electromagnetic wave and thus sintered to provide a sintered body generally having a geometry of ball 113 or the like. The shaped body is sintered by being heated in an atmosphere of an inert gas or that of a gaseous mixture of nitrogen and oxygen to a range of 1550° C. to 1800° C. The inert gas can be helium, neon, argon, nitrogen or the like. In view of production cost reduction, nitrogen is preferably adopted.

Then the sintered body produced in the sintering step has a surface worked to remove a portion including that surface, i.e., it is worked for finish, to complete a torque transmission member for a universal joint, i.e., a finishing step is performed. More specifically, the sintered body produced in the sintering step has a surface polished to complete a torque transmission member implemented as ball 113 or the like for a universal joint. Through the above steps the torque transmission member for the universal joint in the present embodiment completes.

Herein, the sintering step provides a sintered body having at a portion from its surface to a depth of approximately 500 μm a high density layer higher in density than an inner portion and having a portion white in color, or a white color portion, as observed in cross section with an optical microscope with oblique illumination, having an area ratio equal to or smaller than 7%. Furthermore, the sintered body has at a portion from its surface to a depth of approximately 150 μm a higher density layer further higher in density than another portion of the high density layer and having a portion white in color, or a white color portion, as observed in cross section with an optical microscope with oblique illumination, having an area ratio equal to or smaller than 3.5%. Accordingly in the finishing step the sintered body is removed preferably by a thickness equal to or smaller than 150 μm in a portion that should serve as a contact surface in particular. This allows the higher density layer to remain in a portion including ball rolling contact surface 113A to provide the torque transmission member for the universal joint with improved durability against rolling and sliding contact fatigue.

Fourth Embodiment

Figure 17:
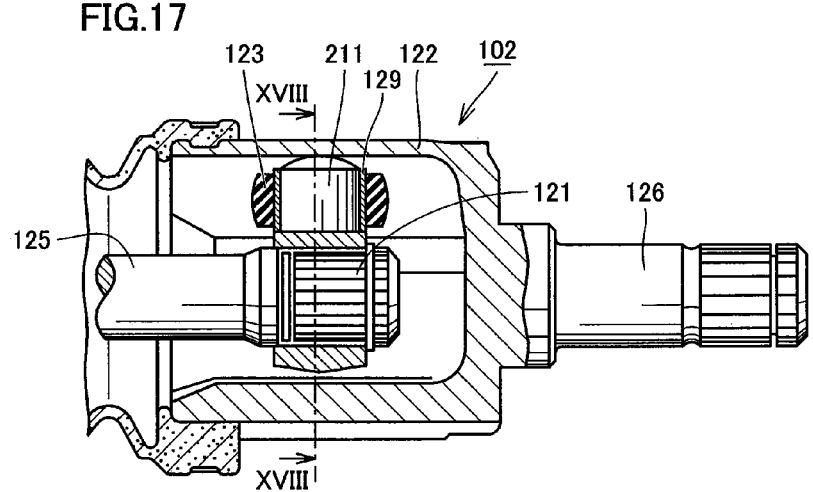
FIG. 17 is a schematic cross section of a configuration of a constant velocity joint (a tripod joint) in a fourth embodiment.
Figure 18:
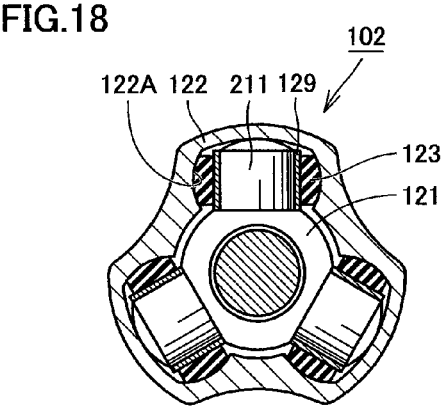
FIG. 18 is a schematic cross section taken along a line XVIII-XVIII shown in FIG. 17.
Figure 19:
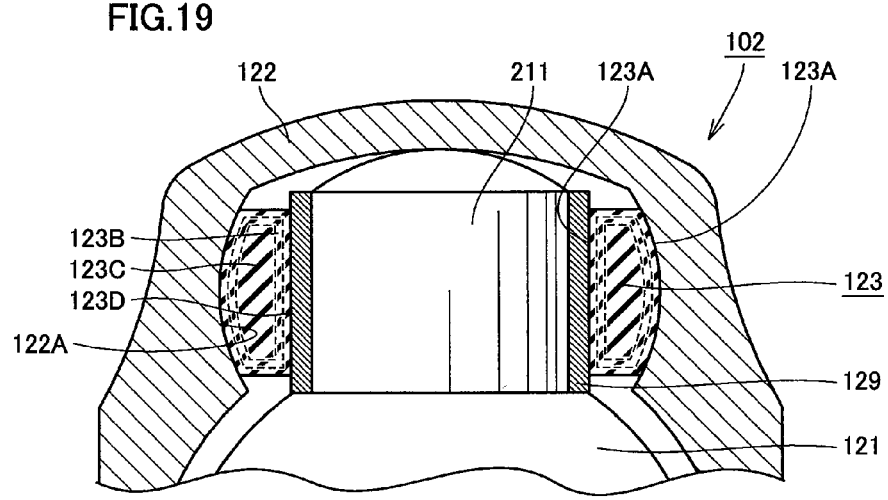
FIG. 19 is an enlarged schematic partial cross section of a main portion of FIG. 18.

With reference to FIG. 17 to FIG. 19, the present invention in a fourth embodiment provides a universal joint implemented as a tripod joint configured as will be described hereinafter.

With reference to FIG. 17 to FIG. 19, the fourth embodiment provides a tripod joint 102 basically similar in configuration and effect to fixed joint 101 of the third embodiment. However, the former is different from the latter in how the race member and the torque transmission member are configured. More specifically, tripod joint 102 includes a tripod 121 that has a tripod shaft 211 extending in a single plane in three directions and is connected to a second shaft member implemented as a shaft 125, a race member implemented as an outer race 122 arranged to surround tripod 121 and connected to a first shaft member implemented as a shaft 126, and a torque transmission member implemented as an annular spherical roller 123 attached to tripod shaft 211 via a needle roller 129 rollably and having an outer circumferential surface having a spherical roller rolling contact surface 123A in contact with a surface of an outer race groove 122A formed in an inner circumferential surface of outer race 122.

Thus in tripod joint 102 when one of shafts 125, 126 receives rotation about an axis the rotation can be transmitted via tripod 121, outer race 122 and spherical roller 123 to the other of shafts 125, 126 at a constant velocity and shafts 125, 126 can also move relative to each other in an axial direction passing through the center of shafts 125, 126.

In other words the fourth embodiment provides tripod joint 102 serving as a universal joint, including a race member implemented as outer race 122 connected to a first shaft member implemented as shaft 126, a torque transmission member implemented as spherical roller 123 arranged in contact with outer race 122 and rollably and slidably on a surface of outer race groove 122A formed in outer race 122, and a second shaft member implemented as shaft 125 connected to shaft 126 via spherical roller 123 and outer race 122. Furthermore, tripod joint 102 is a universal joint transmitting the rotation transmitted to one of shaft 126 and shaft 125 about an axis to the other of shaft 126 and shaft 125.

Furthermore, spherical roller 123 is a torque transmission member for a universal joint, that is provided in the universal joint implemented as tripod joint 102, and is posed rollably and slidably between a race member implemented as outer race 122 connected to a first shaft member implemented as shaft 126 and a second shaft member implemented as shaft 125 and transmits the rotation transmitted to one of shaft 126 and shaft 125 about an axis to the other of shaft 126 and shaft 125.

Herein, with reference to FIG. 18 and FIG. 19, the present embodiment provides a torque transmission member for a universal joint, that is implemented as spherical roller 123, which corresponds to ball 113 of the third embodiment and similarly has an inner portion 123C, a high density layer (a spherical roller high density layer 123B) and a higher density layer (a spherical roller higher density layer 123D). Thus the present embodiment provides tripod joint 102 that is a universal joint including a torque transmission member for the universal joint (spherical roller 123) formed of a sintered β-sialon inexpensive and capable of reliably ensuring sufficient durability. Note that the universal joint implemented in the fourth embodiment as tripod joint 102 and the torque transmission member implemented in the same embodiment for the universal joint as spherical roller 123 that tripod joint 102 includes can be produced similarly as they are produced in the third embodiment.

Note that while in the above embodiment the present universal joint is exemplified by a fixed joint and a tripod joint, the present universal joint is not limited thereto. For example, the universal joint may be a double offset joint (DOJ), a free ring tripod joint (FTJ), a cross groove joint (LJ) or the like.

The present universal joint may have its race member formed of a material which is not particularly limited. For example it may specifically be Japanese Industrial Standard (JIS) S53C or similar carbon steel, SCR420, SCM420 or a similar carburizing steel. Furthermore, the present universal joint may have its race member formed of a material of ceramics such as silicon nitride and sialon (including β-sialon).

Fifth Embodiment

Hereinafter reference will be made to FIG. 20 and FIG. 21 to describe a spherical plain bearing implementing a sliding device in a fifth embodiment of the present invention.

Figure 20:
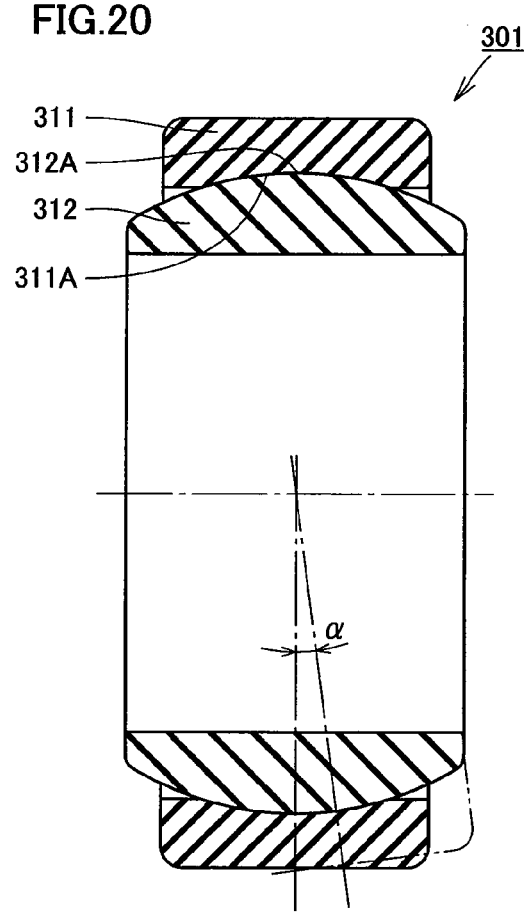
FIG. 20 is a schematic cross section of a configuration of a spherical plain bearing in a fifth embodiment.

With reference to FIG. 20, the fifth embodiment provides a spherical plain bearing 301 including a sliding member implemented by an annular outer ring 311 and a sliding member implemented by an annular inner ring 312 disposed at an inner circumference of outer ring 311. Outer ring 311 has an inner circumferential surface having an outer ring sliding surface 311A having a spherical surface, and inner ring 312 has an outer circumferential surface having an inner ring sliding surface 312A having a spherical surface. Outer ring 311 and inner ring 312 are disposed to have outer ring sliding surface 311A and inner ring sliding surface 312A in contact with each other. At least one of outer ring sliding surface 311A and inner ring sliding surface 312A may be provided with a film of molybdenum disulfide or a similar solid lubricant.

Spherical plain bearing 301 thus has outer ring 311 and inner ring 312 sliding relative to each other in a circumferential direction and thus capable of rotating and swinging. Furthermore, outer ring sliding surface 311A and inner ring sliding surface 312A having spherical surfaces, respectively, allow outer ring 311 and inner ring 312 to have their respective axes of rotation forming an angle within the range of a swing angle α.

Figure 21:
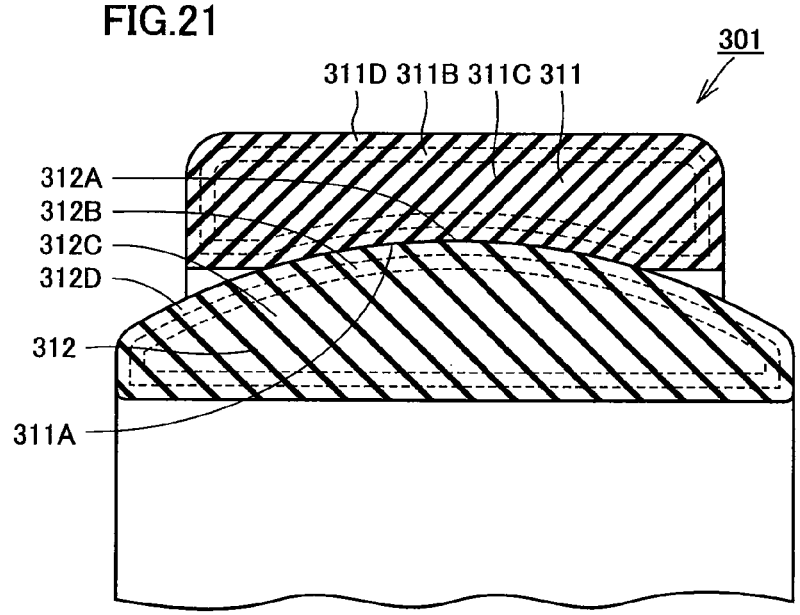
FIG. 21 is an enlarged schematic partial cross section of a main portion of FIG. 20

In other words, with reference to FIG. 20 and FIG. 21, a sliding device implemented by spherical plain bearing 301 includes as constituents outer ring 311 and inner ring 312 serving as sliding members each contacting the adjacent other member (inner ring 312 and outer ring 311) and thus sliding relative to that other member. The sliding member implemented as outer ring 311 and inner ring 312 is configured of a sintered body that contains a β-sialon as a main component and has a remainder formed of an impurity. Furthermore, with reference to FIG. 21, the sliding member contacts the other member at a surface, which will hereinafter be referred to as a contact surface, indicated as outer ring sliding surface 311A and inner ring sliding surface 312A, which are included in a portion provided with a high density layer (an outer ring high density layer 311B and an inner ring high density layer 312B) higher in density than inner portions 311C, 312C. When outer ring high density layer 311B and inner ring high density layer 312B are observed in cross section with an optical microscope with oblique illumination, they exhibit a portion white in color, hereinafter also referred to as a white color portion, having an area ratio equal to or smaller than 7%.

The present embodiment thus provides spherical plain bearing 301 that serves as a sliding device including a sliding member (outer ring 311 and inner ring 312) formed of a sintered β-sialon inexpensive and capable of reliably ensuring sufficient durability. The impurity includes an unavoidably introduced impurity including those derived from a source material or entering during the production process.

Note that in the present embodiment the sliding member implemented as outer ring 311 and inner ring 312 may be configured of a sintered body that contains β-sialon as a main component and has a remainder formed of a sintering additive and an unavoidably introduced impurity. The sintering additive helps to reduce the sintered body in porosity and hence provide a sliding device including a sliding member formed of a sintered β-sialon capable of reliably ensuring sufficient durability. The impurity includes an unavoidably introduced impurity including those derived from a source material or entering during the production process.

Furthermore, with reference to FIG. 21, outer ring high density layer 311B and inner ring high density layer 312B have a surface, or outer ring sliding surface 311A and an inner ring sliding surface 312A, included in a portion provided with an outer ring higher density layer 311D and an inner ring higher density layer 312D further higher in density than another portion of outer ring high density layer 311B and inner ring high density layer 312B. When outer ring higher density layer 311D and inner ring higher density layer 312D are observed in cross section with an optical microscope with oblique illumination, they exhibit a white color portion having an area ratio equal to or smaller than 3.5%. Outer ring 311 and inner ring 312 are thus further improved in wear resistance and hence durability.

Hereinafter will be described a method of producing the sliding member and device in the fifth embodiment serving as one embodiment of the present invention.

Figure 22:
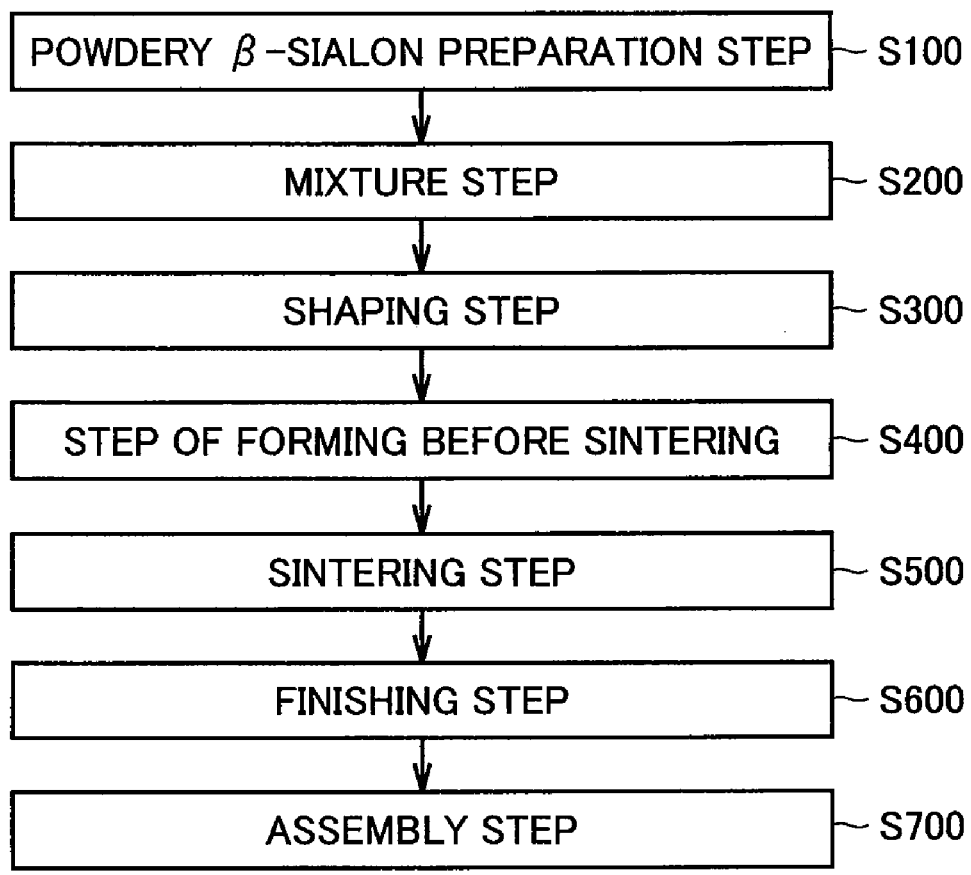
FIG. 22 is a flowchart for generally illustrating a method of producing a sliding device and a sliding member in the fifth embodiment.

With reference to FIG. 22, in the present embodiment, a sliding device and a sliding member are produced in a method, as follows: Initially, in step (S100), powdery β-sialon is prepared in a powdery β-sialon preparation step. The powdery β-sialon preparation step can be performed for example with combustion synthesis adopted in a production step to produce powdery β-sialon inexpensively.

Then in step (S200) a mixture step is performed to add a sintering additive to the powdery β-sialon prepared in the powdery β-sialon preparation step and mix them together. The mixture step can be eliminated if the sintering additive is not added.

Then in step (S300) a shaping step is performed to shape the powdery β-sialon or the mixture of the powdery β-sialon and the sintering additive generally into the geometry of the sliding member. More specifically, the powdery β-sialon or the mixture of the powdery β-sialon and the sintering additive is press-formed, cast-molded, extrusion-formed, rolling-granulated, or similarly shaped to provide a body shaped generally into the geometry of the sliding member implemented as outer ring 311, inner ring 312 and the like.

Then in step (S400) the step of forming before sintering is then performed to form a surface of the shaped body to allow the shaped body that has been sintered to have a geometry closer to that of a sliding member as desired. More specifically, green body forming or a similar forming technique is used to shape the shaped body so that the shaped body having been sintered can have a geometry closer to that of outer ring 311, inner ring 312 or the like. The step of forming before sintering can be eliminated if the shaping step provides a shaped body in a condition allowing the shaped body that has been sintered to have a geometry close to that of a sliding member as desired.

Then in step (S500) a sintering step is performed to sinter the shaped body at a pressure equal to or smaller than 1 MPa. More specifically, the shaped body is heated with a heater, a microwave, a millimeter wave or a similar electromagnetic wave and thus sintered to provide a sintered body generally having a geometry of outer ring 311, inner ring 312 or the like. The shaped body is sintered by being heated in an atmosphere of an inert gas or that of a gaseous mixture of nitrogen and oxygen to a range of 1550° C. to 1800° C. The inert gas can be helium, neon, argon, nitrogen or the like. In view of production cost reduction, nitrogen is preferably adopted.

Then in step (S600) the sintered body produced in the sintering step has a surface worked to remove a portion including that surface, i.e., it is worked for finish, to complete a sliding member, i.e., a finishing step is performed. More specifically, the sintered body produced in the sintering step has a surface polished to complete a sliding member implemented as outer ring 311, inner ring 312 and the like. Through the above steps the sliding member in the present embodiment completes.

Herein, the sintering step provides a sintered body having at a portion from its surface to a depth of approximately 500 μm a high density layer higher in density than an inner portion and having a portion white in color, or a white color portion, as observed in cross section with an optical microscope with oblique illumination, having an area ratio equal to or smaller than 7%. Furthermore, the sintered body has at a portion from its surface to a depth of approximately 150 μm a higher density layer further higher in density than another portion of the high density layer and having a portion white in color, or a white color portion, as observed in cross section with an optical microscope with oblique illumination, having an area ratio equal to or smaller than 3.5%. Accordingly in the finishing step the sintered body is removed preferably by a thickness equal to or smaller than 150 μm in a portion that should serve as a contact surface in particular. This allows the higher density layer to remain in a portion including outer ring sliding surface 311A and inner ring sliding surface 312A to provide the sliding member with larger wear resistance.

With reference to FIG. 22, step (S700) is performed to combine the thus produced sliding members together to assemble a sliding device, i.e., an assembling step is performed. More specifically, outer ring 311 and inner ring 312 produced in steps (S100) to (S600) are combined together to assemble spherical plain bearing 301 implementing a sliding device in the present embodiment. This competes a method of producing a sliding device in the present embodiment to complete spherical plain bearing 301 implementing the sliding device. At least one of outer ring sliding surface 311A and inner ring sliding surface 312A may be provided with a film of molybdenum disulfide or a similar solid lubricant and in that condition outer ring 311 and inner ring 312 may be combined together to assemble spherical plain bearing 301.

Sixth Embodiment

The present invention in a sixth embodiment provides a sliding device, as will be described hereinafter.

Figure 23:
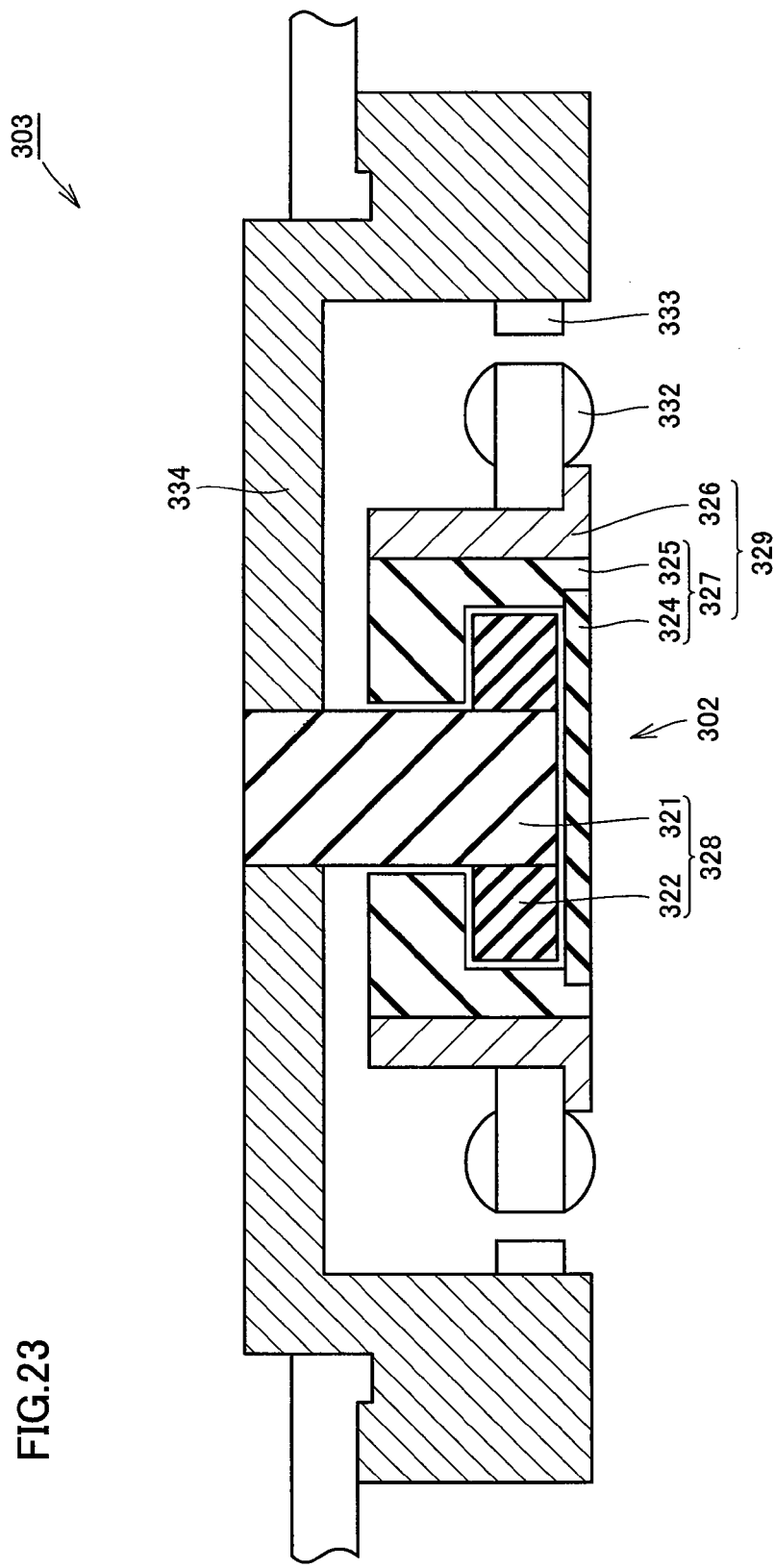
FIG. 23 is a schematic cross section of a configuration of a spindle motor including a fluid dynamic bearing unit in a sixth embodiment.

With reference to FIG. 23, a spindle motor 303 is a spindle motor for a hard disk drive (HDD). It is provided in the HDD to rotate a magnetic disc. Spindle motor 303 includes a disc hub 334 holding a magnetic disc (not shown), a fluid dynamic bearing unit 302 holding disc hub 334 rotatably in a circumferential direction, a motor stator 332 provided at an outer circumferential surface of fluid dynamic bearing unit 302, and a motor rotor 333 provided at disc hub 334 opposite to motor stator 332. Fluid dynamic bearing unit 302 includes a shaft member 328 secured to disc hub 334, and a bearing 329 holding shaft member 328 rotatably about an axis. Thus when motor stator 332 receives a current from a power supply (not shown), a driving force is generated to rotate motor rotor 333 about an axis and disc hub 334 rotates relative to bearing 329 of fluid dynamic bearing unit 302.

Figure 24:
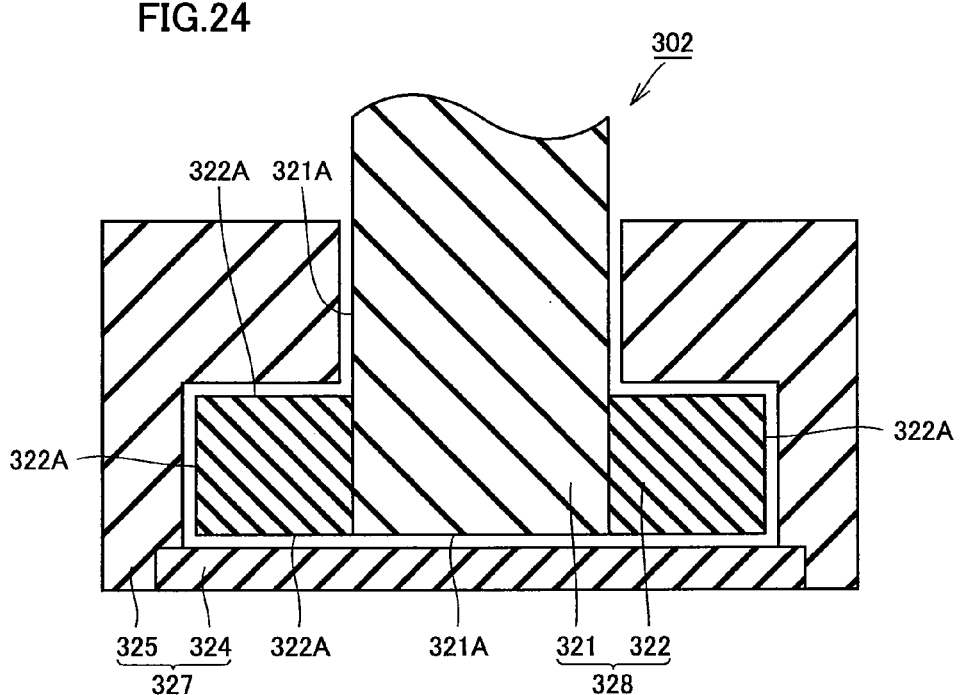
FIG. 24 is a schematic partial cross section of a vicinity of the FIG. 23 fluid dynamic bearing unit

The present embodiment provides the fluid dynamic bearing unit, as will be described hereinafter. With reference to FIG. 24, fluid dynamic bearing unit 302 includes shaft member 328, and a bearing member 327 surrounding a portion of shaft member 328 and holding shaft member 328 rotatably about an axis. Shaft member 328 has a cylindrical shaft portion 321, and a disk flange portion 322 surrounding shaft portion 321 at an end circumferentially and having an outer diameter larger than that of shaft portion 321. Bearing member 327 has a bottom wall portion 324 in the form of a flat plate disposed opposite to an end surface of shaft portion 321 and one end surface of flange portion 322 with a predetermined gap posed therebetween, and a hollow, cylindrical side wall portion 325 disposed opposite to an outer circumferential surface of flange portion 322, the other end surface of flange portion 322, and an outer circumferential surface of shaft portion 321 with a predetermined gap posed therebetween. The gap between shaft member 328 and bearing member 327 is filled with a lubricant or a similar fluid.

Thus when shaft member 328 rotates about an axis relative to bearing member 327 the fluid's dynamic pressure effect supports shaft member 328 without contacting bearing member 327.

As described above, when shaft member 328 is rotating relative to bearing member 327 at a sufficient speed shaft member 328 is supported without contacting bearing member 327. When shaft member 328 starts to rotate relative to bearing member 327 (i.e., when it is actuated) and immediately before shaft member 328 ends rotating relative to bearing member 327 (i.e., when its operation ends), the dynamic pressure effect is insufficient, and shaft member 328 and bearing member 327 contact each other and thus slide. More specifically, shaft portion 321 and flange portion 322 configuring shaft member 328 and bottom wall portion 324 and side wall portion 325 configuring bearing member 327 are sliding members each contacting the adjacent other member and thus sliding relative to that other member.

The sliding member implemented as shaft portion 321, flange portion 322, bottom wall portion 324 and side wall portion 325 is configured of a sintered body that contains β-sialon as a main component and has a remainder formed of an impurity. Furthermore, with reference to FIG. 25, the sliding member contacts the other sliding member at a surface, which will be hereinafter referred to as a contact surface, indicated as a shaft portion contact surface 321A, a flange portion contact surface 322A, a bottom wall portion contact surface 324A and a side wall portion contact surface 325A, which are included in a portion provided with a high density layer (a shaft portion high density layer 321B, a flange portion high density layer 322B, a bottom wall portion high density layer 324B and a side wall portion high density layer 325B) higher in density than inner portions 321C, 322C, 324C, 325C. When shaft portion high density layer 321B, flange portion high density layer 322B, bottom wall portion high density layer 324B and side wall portion high density layer 325B are observed in cross section with an optical microscope with oblique illumination, they exhibit a portion white in color, hereinafter also referred to as a white color portion, having an area ratio equal to or smaller than 7%.

The present embodiment thus provides fluid dynamic bearing unit 302 that serves as a sliding device including a sliding member (shaft portion 321, flange portion 322, bottom wall portion 324 and side wall portion 325) formed of a sintered β-sialon inexpensive and capable of reliably ensuring sufficient durability. The impurity includes an unavoidably introduced impurity including those derived from a source material or entering during the production process.

Note that in the present embodiment the sliding member implemented as shaft portion 321, flange portion 322, bottom wall portion 324 and side wall portion 325 may be configured of a sintered body that contains β-sialon as a main component and has a remainder formed of a sintering additive and an unavoidably introduced impurity. The sintering additive helps to reduce the sintered body in porosity and hence provide a sliding device including a sliding member formed of a sintered β-sialon capable of reliably ensuring sufficient durability. The impurity includes an unavoidably introduced impurity including those derived from a source material or entering during the production process.

Figure 25:
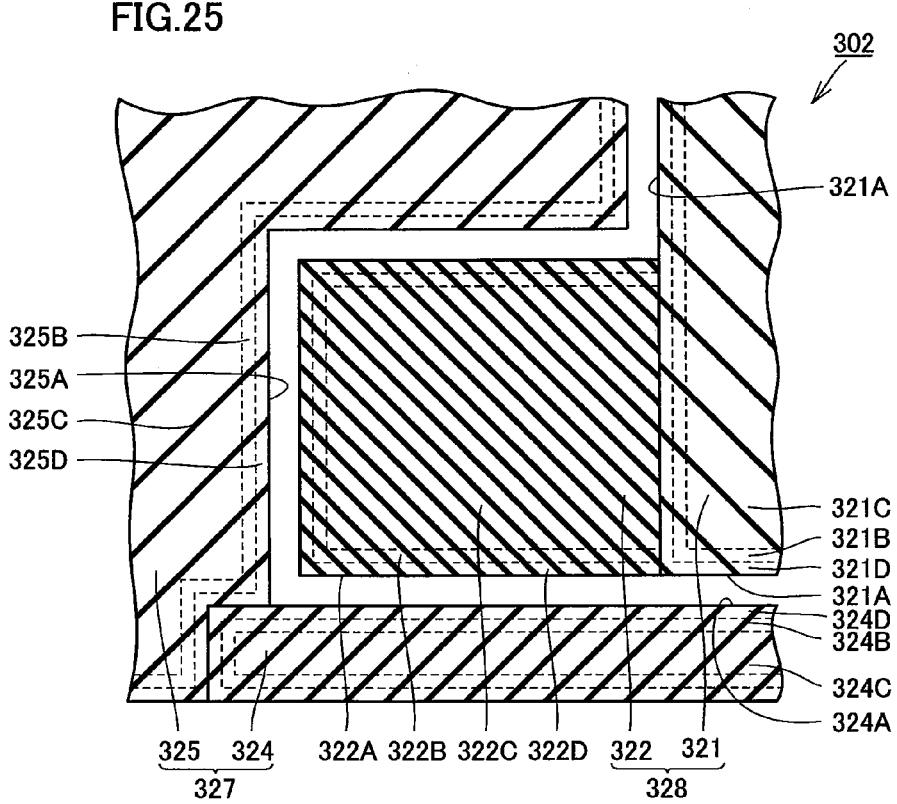
FIG. 25 is a schematic partial cross section of a main portion of the fluid dynamic bearing unit

Furthermore, with reference to FIG. 25, shaft portion high density layer 321B, flange portion high density layer 322B, bottom wall portion high density layer 324B and side wall portion high density layer 325B have a surface, or shaft portion contact surface 321A, flange portion contact surface 322A, bottom wall portion contact surface 324A and side wall portion contact surface 325A, included in a portion provided with a shaft portion higher density layer 321D, a flange portion higher density layer 322D, a bottom wall portion higher density layer 324D and a side wall portion higher density layer 325D further higher in density than another portion of shaft portion high density layer 321B, flange portion high density layer 322B, bottom wall portion high density layer 324B and side wall portion high density layer 325B. When shaft portion higher density layer 321D, flange portion higher density layer 322D, bottom wall portion higher density layer 324D and side wall portion higher density layer 325D are observed in cross section with an optical microscope with oblique illumination, they exhibit a white color portion having an area ratio equal to or smaller than 3.5%. Shaft portion 321, flange portion 322, bottom wall portion 324 and side wall portion 325 are thus further improved in wear resistance and hence durability.

Note that the sliding device implemented in the present embodiment by fluid dynamic bearing unit 302 and the sliding member implemented in the present embodiment by shaft portion 321, flange portion 322, bottom wall portion 324 and side wall portion 325 can be produced in a method similar to that of producing the sliding device implemented in the fifth embodiment by spherical plain bearing 301 and the sliding member implemented in the same embodiment by outer ring 311 and inner ring 312.

Furthermore, while the sixth embodiment has been described for shaft member 328 having shaft portion 321 and flange portion 322 as discrete members, shaft member 328 may alternatively be a member in one piece.

Furthermore, while the fifth and sixth embodiments have been described for sliding devices having their constituent sliding members all constituted of sintered β sialon in accordance with the present invention, the present sliding device is not limited thereto, and may have the present sliding member applied to at least one of the sliding members. For example, the fifth embodiment provides spherical plain bearing 301, which may have one of outer ring 311 and inner ring 312 provided by the present sliding member and the other provided as a sliding member departing from the scope of the present invention. The sliding member departing from the scope of the present invention may be formed using a material of quench-hardened high-carbon chromium bearing steel (JIS SUJ2 for example) having a surface coated with phosphate. Furthermore, the sixth embodiment provides fluid dynamic bearing unit 302, which can configure a fluid dynamic bearing unit which is inexpensive and also capable of reliably ensuring sufficient durability by having the present sliding member as shaft member 328, with the production cost considered, as shaft member 328 is relatively simple in geometry. Bearing member 327 can be formed using a material of oil-impregnated, sintered metal impregnated for example with a lubricant, a lubricating grease, or the like.

Furthermore, while the above embodiments have been described for one example of the present sliding device and sliding member implemented by a spherical plain bearing, a fluid dynamic bearing unit and their sliding members, the present sliding device and sliding member are not limited thereto. The present sliding device and sliding member may for example be a linear guide, an X-Y table or a similar linear motion device, a rocker arm, a ball valve or a similar component of an engine, and a sliding member included thereby.

EXAMPLE 1

Hereinafter the present invention in an example 1 will be described. A test is conducted to inspect how the present rolling contact member, torque transmission member for a universal joint, and sliding member have a high density layer and a higher density layer formed, as seen in cross section. The test is conducted in the following procedure:

Initially, combustion synthesis is employed to prepare powdery β-sialon (product name: Meramix, produced by Isman J Corporation) having a composition of $Si_5AlON_7$, and therefrom a specimen in the form of a cube having each side of approximately 10 mm is produced in a method similar to that of producing a rolling contact member, a torque transmission member for a universal joint, and a sliding member, as described in the above embodiment. More specifically, it is produced in a method, as follows: Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) are wet-mixed using a ball mill. Subsequently, a spray dryer is used to granulate the intermediate product to produce granulated powder. The granulated powder is introduced in a die and thus shaped to have a predetermined geometry, and furthermore, a cold isostatical press (CIP) is employed to apply pressure to obtain a shaped body. Subsequently the shaped body is heated in an atmosphere of nitrogen of a pressure of 0.4 MPa to 1650° C. and thus sintered to produce the above cubic specimen.

Subsequently, the specimen is cut and the cut surface is lapped with a diamond lap and thereafter mirror-lapped with a chromium oxide lap to obtain a cross section including a center of the cube for observation. The cross section is observed with an optical microscope (Microphoto-FXA produced by Nikon Corporation) with oblique illumination and imaged in an instant photograph (FP-100B produced by FUJIFILM Corporation) of a magnification of 50 times. Subsequently, the obtained photograph's image is taken in via a scanner (with a resolution of 300 dpi) to a personal computer. Image processing software (WinROOF produced by Mitani Corporation) is used to perform a binarization process by a brightness threshold value (in the present example, a binarizing separation threshold value: 140) to measure a white color portion for an area ratio.

The test provides a result, as described hereinafter. Note that FIG. 26 shows a photograph having an upper side showing a side of a specimen that is closer to a surface thereof, and a top end corresponding to the surface.

Figure 26:
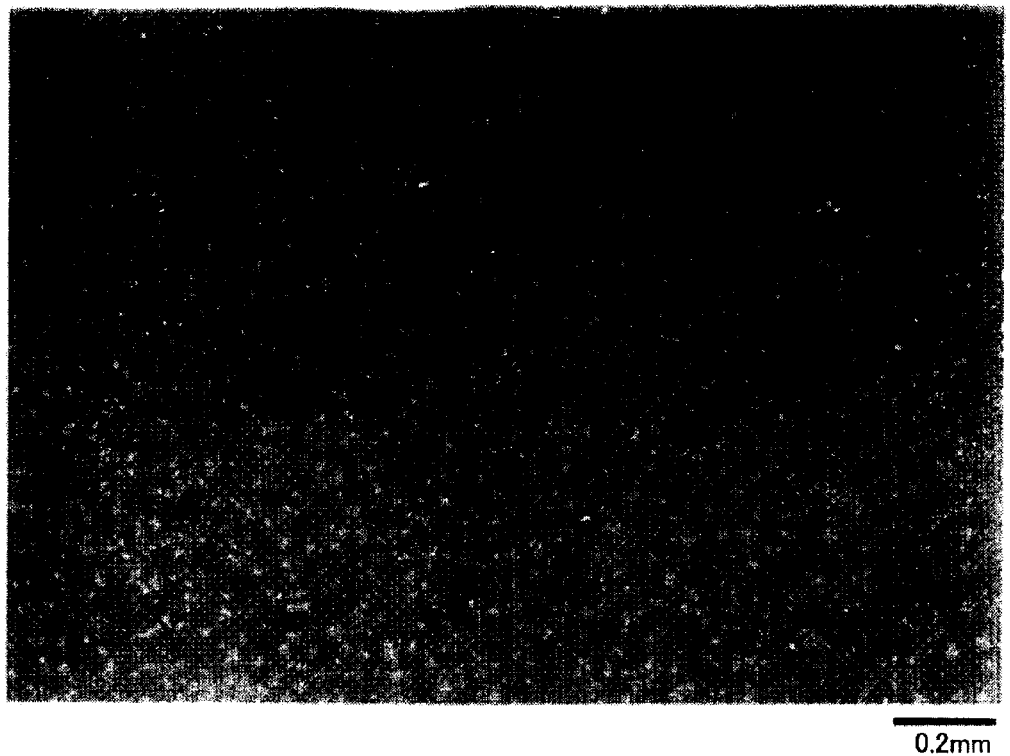
FIG. 26 is a photograph of a specimen for observation in cross section, as shot via an optical microscope with oblique illumination.
Figure 27:
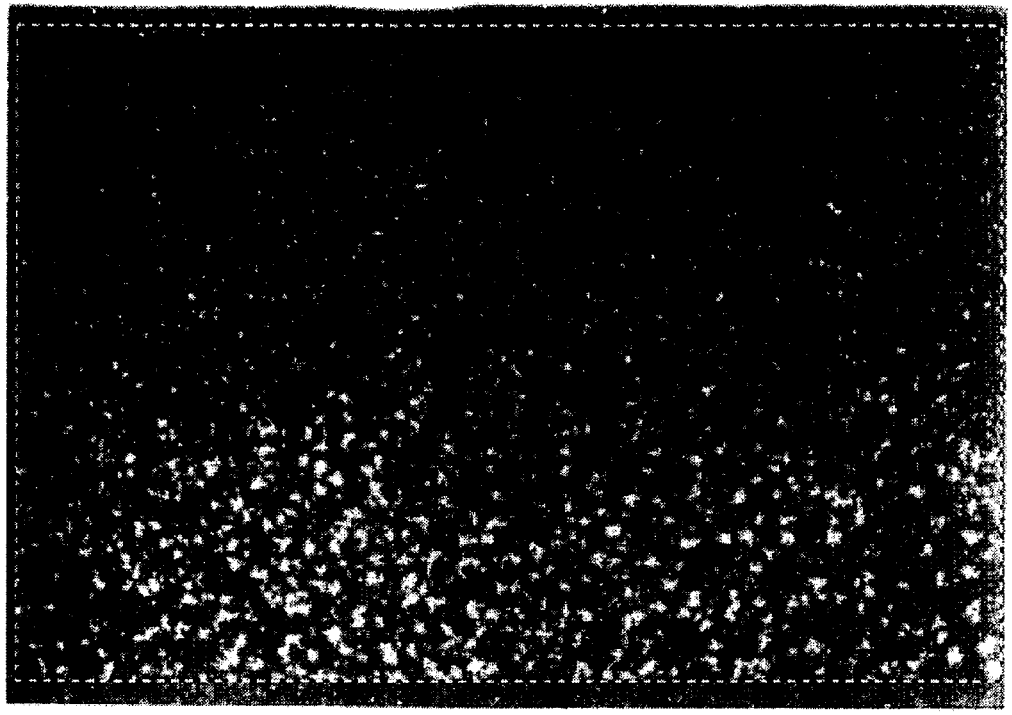
FIG. 27 shows one example of binarizing the FIG. 26 photographic image by a brightness threshold value using image processing software.
Figure 28:
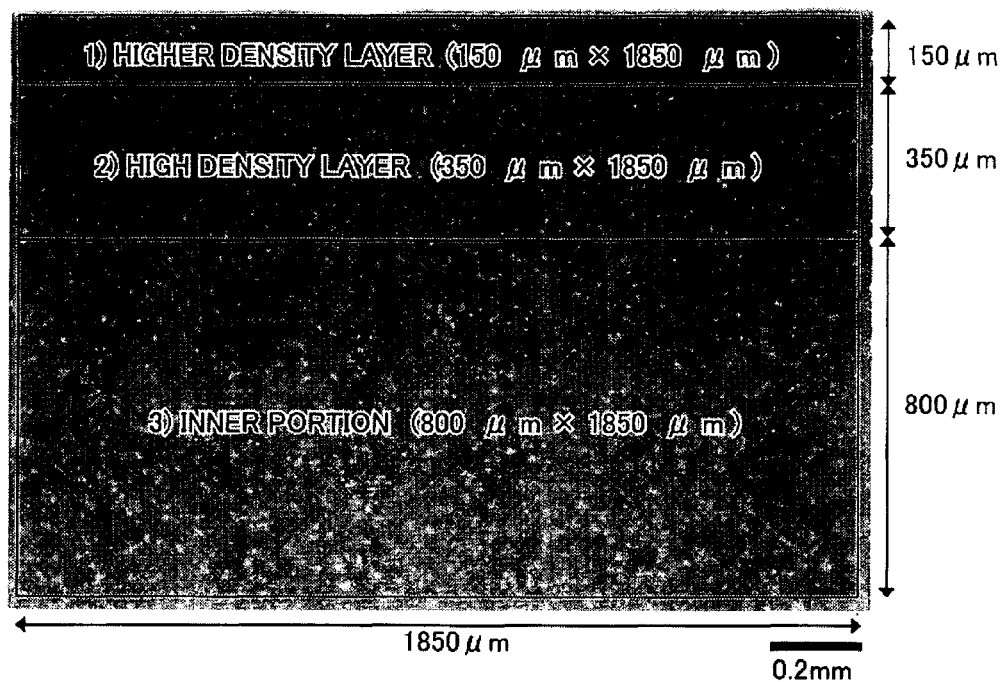
FIG. 28 shows a region subjected to an image process (a region to be evaluated) in binarizing the FIG. 26 photographic image by the brightness threshold value using the image processing software.

With reference to FIG. 26 and FIG. 27, it can be seen that a specimen in the present example produced in a method similar to that of producing the present rolling contact member, torque transmission member for a universal joint, and sliding member has in a portion including a surface a layer having a white color portion less than an inner portion does, and as shown in FIG. 28, a shot photograph's image is divided in accordance with a distance from an outermost surface of the specimen into three regions (i.e., a region from the outermost surface to a depth of 150 μm, a region that exceeds 150 μm and does not exceed 500 μm, and a region that exceeds 500 μm and does not exceed 800 μm), and each region is subjected to image analysis to calculate a white color portion for area ratio. A result shown in table 1 is obtained. In table 1, the FIG. 28 each shown region serves as one field of view, and from five randomly shot photographs, five fields of view are obtained. For each field, a white color portion is measured for area ratio, and their average and maximum values are indicated.

TABLE 1

|  | Depth from Outermost Surface (μm) | Area Ratio of White Color Portion (%) | |
| --- | --- | --- | --- |
|  |  | Ave. of 5 Fields of View | Max. of 5 Fields of View |
| 1) Higher Density Layer | 150 | 1.2 | 3.5 |
| 2) High Density Layer | 150-500 | 3.7 | 7.0 |
| 3) Inner Portion | >500 | 18.5 | 22.4 |

With reference to table 1, the present example provides a white color portion having an area ratio of 18.5% for an inner portion, and, in contrast, 3.7% for the region having a depth equal to or smaller than 500 μm from a surface, and 1.2% for the region having a depth equal to or smaller than 150 μm from the surface. It has been confirmed therefrom that a specimen produced in the present example in a method similar to that of producing the present rolling contact member, torque transmission member for a universal joint, and sliding member has in a portion including a surface a high density layer and a higher density layer having a white color portion less than an inner portion does.

EXAMPLE 2

Hereinafter the present invention in an example 2 will be described. A test is conducted to confirm the present rolling contact member's rolling contact fatigue life. The test is conducted in the following procedure:

Initially, a bearing to be tested is produced in a method, as will be described hereinafter. Initially, combustion synthesis is employed to prepare powdery β-sialon (product name: Meramix, produced by Isman J Corporation) having a composition of $Si_5AlON_7$, and therefrom a ⅜ inch ceramic ball having a diameter of 9.525 mm is produced in a method similar to that of producing a rolling contact member, as described in the first embodiment with reference to FIG. 7. More specifically, it is produced in a method, as follows: Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) are wet-mixed using a ball mill. Subsequently, a spray dryer is used to granulate the intermediate product to produce granulated powder. The granulated powder is introduced in a die and thus shaped to be a sphere, and furthermore, a cold isostatical press (CIP) is employed to apply pressure to obtain a spherically shaped body.

Then the shaped body is subjected to green body forming so that after it is sintered it has a predetermined working thickness. Subsequently the shaped body is heated in an atmosphere of nitrogen of a pressure of 0.4 MPa to 1650° C. and thus sintered to produce a sintered spherical body. Then the sintered spherical body is lapped to be a ⅜ inch ceramic ball (a rolling element; JIS grade: G5). It is then combined with a separately prepared bearing washer of bearing steel (JIS SUJ2) to produce a bearing of JIS type number 6206. Herein, the sintered spherical body is lapped to have a thickness (or a working thickness) removed in 8 levels to produce 8 types of bearings (examples A-H of the present invention). In contrast, for comparison, silicon nitride and a sintering additive are used to provide a powdery source material which is in turn pressure-sintered to provide a sintered spherical body (EC141 produced by NGK Spark Plug Co. Ltd.) which is in turn lapped, similarly as described above, and combined with a separately prepared bearing washer of bearing steel (JIS SUJ2) to produce a bearing of JIS type number 6206 (comparative example A). It is lapped by a thickness of 0.25 mm.

The test is conducted in the following conditions: A bearing of JIS type number 6206 produced as described above undergoes a fatigue test such that it experiences a maximum contact pressure Pmax of 3.2 GPa and is rotated at 2000 rpm, using a lubricant of turbine oil VG68 (clean oil) circularly fed, and thus tested at room temperature. A vibration detector is employed to monitor how the bearing in operation vibrates, and after the bearing has a rolling element damaged when the bearing's vibration exceeds a predetermined value, the test is stopped, and a period of time having elapsed since the bearing started to operate until the test is stopped is recorded as the bearing's life. Note that 15 bearings for each example of the present invention and the comparative example are tested and their $L_{10}$ lives are calculated and evaluated for durability by a life ratio in comparison with comparative example A.

TABLE 2

|  | Working Thickness (mm) | $L_{10}$ Life (Hours) | Life Ratio |
| --- | --- | --- | --- |
| Ex. A | 0.05 | 6492 | 3.19 |
| Ex. B | 0.10 | 6387 | 3.14 |
| Ex. C | 0.15 | 6404 | 3.15 |
| Ex. D | 0.20 | 3985 | 1.96 |
| Ex. E | 0.30 | 4048 | 1.99 |
| Ex. F | 0.40 | 3945 | 1.94 |
| Ex. G | 0.50 | 3069 | 1.51 |
| Ex. H | 0.60 | 867 | 0.43 |
| Comp. Ex. A | 0.25 | 2036 | 1.00 |

Table 2 shows a result of testing the present example. With reference to table 2, it can be said that the present example provides bearings all having satisfactory life with their production costs and the like considered. A working thickness set to be equal to or smaller than 0.5 mm to provide a rolling element having a surface with a high density layer remaining therein, i.e., the present invention in examples D-G, provides a bearing having a life approximately 1.5-2 times that of comparative example A. Furthermore, a working thickness set to be equal to or smaller than 0.15 mm to provide a rolling element having a surface with a higher density layer remaining therein, i.e., the present invention in examples A-C, provides a bearing having a life approximately 3 times that of comparative example A. It is thus confirmed that a rolling bearing including the present rolling contact member is excellent in durability, and it has been found that a rolling bearing including the present rolling contact member with a working thickness set to be equal to or smaller than 0.5 mm to have a surface with a high density layer remaining therein can have an increased life and a rolling bearing including the present rolling contact member with a working thickness set to be equal to or smaller than 0.15 mm to have a surface with a higher density layer remaining therein can have a further increased life.

EXAMPLE 3

Hereinafter the present invention in an example 3 will be described. A test is conducted to confirm the durability of a torque transmission member for a universal joint in accordance with the present invention against rolling and sliding contact fatigue. The test is conducted in the following procedure:

Initially, a specimen to be tested is produced in a method, as will be described hereinafter. Initially, combustion synthesis is employed to prepare powdery β-sialon (product name: Meramix, produced by Isman J Corporation) having a composition of $Si_5AlON_7$, and therefrom a specimen in the form of a cylinder having a diameter of φ 40 mm is produced in a method similar to that of producing a torque transmission member for a universal joint, as described in the third embodiment with reference to FIG. 16. More specifically, it is produced in a method, as follows: Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) are wet-mixed using a ball mill. Subsequently, a spray dryer is used to granulate the intermediate product to produce granulated powder. The granulated powder is introduced in a die and thus shaped to be a cylinder, and furthermore, a cold isostatical press (CIP) is employed to apply pressure to obtain a cylindrically shaped body.

Then the shaped body is subjected to green body forming so that after it is sintered it has a predetermined working thickness. Subsequently the shaped body is heated in an atmosphere of nitrogen of a pressure of 0.4 MPa to 1650° C. and thus sintered to produce a sintered cylindrical body. Then the sintered cylindrical body has an outer circumferential surface lapped to provide a specimen in the form of a cylinder having a diameter of φ 40 mm. Herein, the sintered cylindrical body is lapped to have a thickness (or a working thickness) removed in 8 levels to produce 8 types of specimens (examples A-H of the present invention). In contrast, for comparison, silicon nitride and a sintering additive are used to provide a powdery source material which is in turn pressure-sintered to provide a sintered cylindrical body which is in turn lapped, similarly as described above, to produce a specimen in the form of a cylinder having a diameter of φ 40 mm (comparative example A). It is lapped by a thickness of 0.25 mm.

The test is conducted in the following conditions: Each specimen prepared as described above is brought into contact with a separately prepared another specimen formed of bearing steel (JIS SUJ2) (in the form of a cylinder having a diameter of φ 40 mm and having been quench-hardened) such that they have their respective axes in parallel and each specimen experiences a maximum contact pressure Pmax of 2.5 GPa at its outer circumferential surface. Each specimen is rotated at 3000 rpm around the axis and the other specimen is rotated around the axis to slide relative to each specimen at a rate of 5%. With a lubricant of turbine oil VG68 (clean oil) fed via a pat, and at room temperature, each specimen is continuously rotated. A rolling and sliding fatigue test (a two-cylinder test) is thus conducted. A vibration detector is employed to monitor how each specimen in operation vibrates, and after each specimen is damaged when its vibration exceeds a predetermined value, the test is stopped, and a period of time having elapsed since each specimen started to operate until the test is stopped is recorded as the specimen's life. Note that 8 specimens for each example of the present invention and the comparative example are tested and their average lives are calculated and evaluated for durability by a life ratio in comparison with comparative example A.

TABLE 3

| | Working Thickness (mm) | Life (Hours) | Life Ratio |
|---|---|---|---|
| Ex. A | 0.05 | 1789 | 5.08 |
| Ex. B | 0.10 | 1762 | 5.01 |
| Ex. C | 0.15 | 1783 | 5.07 |
| Ex. D | 0.20 | 1068 | 3.03 |
| Ex. E | 0.30 | 957 | 2.72 |
| Ex. F | 0.40 | 829 | 2.36 |
| Ex. G | 0.50 | 713 | 2.03 |
| Ex. H | 0.60 | 321 | 0.91 |
| Comp. Ex. A | 0.25 | 352 | 1.00 |

Table 3 shows a result of testing the examples. With reference to table 3, it can be said that the examples of the present invention provide specimens all providing satisfactory life with their production costs and the like considered. A working thickness set to be equal to or smaller than 0.5 mm to provide a specimen having a surface with a high density layer remaining therein, i.e., the present invention in examples D-G, allows the specimen to have a life approximately 2-3 times that of comparative example A. Furthermore, a working thickness set to be equal to or smaller than 0.15 mm to provide a specimen having a surface with a higher density layer remaining therein, i.e., the present invention in examples A-C, allows the specimen to have a life approximately 5 times that of comparative example A. It is thus considered therefrom that a universal joint including a torque transmission member for the universal joint in accordance with the present invention is excellent in durability, and that the universal joint including the torque transmission member for the universal joint with a working thickness set to be equal to or smaller than 0.5 mm to have a surface with a high density layer remaining therein can provide an increased life and the universal joint including the torque transmission member for the universal joint with a working thickness set to be equal to or smaller than 0.15 mm to have a surface with a higher density layer remaining therein can provide a further increased life.

EXAMPLE 4

Hereinafter the present invention in an example 4 will be described. A test is conducted to confirm the present sliding member's wear resistance. The test is conducted in the following procedure:

Initially, a specimen to be tested is produced in a method, as will be described hereinafter. Initially, combustion synthesis is employed to prepare powdery β-sialon (product name: Meramix, produced by Isman J Corporation) having a composition of $Si_5AlON_7$, and therefrom a specimen for a sliding test is produced in a method similar to that of producing a sliding member, as described in the fifth embodiment with reference to FIG. 22. More specifically, it is produced in a method, as follows: Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) are wet-mixed using a ball mill. Subsequently, a spray dryer is used to granulate the intermediate product to produce granulated powder. The granulated powder is introduced in a die and thus shaped to be a disk, and furthermore, a cold isostatical press (CIP) is employed to apply pressure to obtain a body shaped in a disk.

Subsequently the shaped body is heated in an atmosphere of nitrogen of a pressure of 0.4 MPa to 1650° C. and thus sintered to produce a sintered body in the form of a disk. Then the sintered body in the form of a disk has a flat portion lapped to be a specimen in the form of a disk approximately having a dimension of a diameter φ 20 mm by a thickness t of 5 mm (with a worked surface having a surface roughness equal to or smaller than 0.05 μm Ra). Herein, the sintered body in the form of the disk has the flat portion lapped to have a thickness (or a working thickness) removed in 8 levels to produce 8 types of specimens (examples A-H of the present invention). In contrast, for comparison, silicon nitride and a sintering additive are used to provide a powdery source material which is in turn used to produce a shaped body, similarly as described above, which is in turn pressure-sintered to provide a sintered body in the form of a disk which is in turn lapped, similarly as described above, to produce a specimen in the same shape as described above (comparative example A). It is lapped by a thickness of 0.5 mm.

The test is conducted in the following conditions: Each specimen prepared as described above has a worked flat surface brought into contact with a separately prepared other specimen formed of bearing steel (JIS SUJ2) (in the form of a disk having a diameter of φ40 mm by a thickness t of 10 mm, having been quench-hardened, and having an outer circumferential surface having a surface roughness equal to or smaller than 0.05 μm Ra) such that each specimen experiences a maximum contact pressure of 0.49 GPa at its contact surface. Thus in contact with each other, the other specimen is rotated at an outer peripheral speed of 0.05 m/second. With a lubricant of turbine oil VG32 (clean oil) fed via a pat, and at room temperature, the specimen is continuously rotated for 60 minutes, sliding a distance of 180 m. A wear resistance test (a Savin-type wear test) is thus conducted. After the period of time as above has elapsed, how deep the specimen's flat, sliding portion has been worn is measured.

TABLE 4

| | Working Thickness (mm) | Depth of Wear (μm) |
|---|---|---|
| Ex. A | 0.05 | 0.03 |
| Ex. B | 0.10 | 0.04 |
| Ex. C | 0.15 | 0.04 |
| Ex. D | 0.20 | 0.15 |
| Ex. E | 0.30 | 0.20 |
| Ex. F | 0.40 | 0.22 |
| Ex. G | 0.50 | 0.19 |
| Ex. H | 0.60 | 0.88 |
| Comp. Ex. A | 0.50 | 0.45 |

Table 4 shows a result of the test in the present examples. With reference to table 4, it can be said that the present examples all provide specimens exhibiting satisfactory wear resistance with their production costs and the like considered. Examples D-G having a working thickness equal to or smaller than 0.5 mm to allow their specimens to have a surface with a high density layer remaining thereon have the specimens worn to a depth approximately ½ to ⅓ of that of comparative example A worn. Furthermore, Examples A-C having a working thickness equal to or smaller than 0.15 mm to allow their specimens to have a surface with a higher density layer remaining thereon have the specimens worn to a depth approximately 1/10 of that of comparative example A worn. Thus a sliding device including the present sliding member is considered to have excellent wear resistance, and the sliding device including the present sliding member that has a working thickness equal to or smaller than 0.5 mm to have a surface with a high density layer remaining thereon is considered to have improved wear resistance and the sliding device including the present sliding member that has a working thickness equal to or smaller than 0.15 mm to have a surface with a higher density layer remaining thereon is considered to have further improved wear resistance.

It should be understood that the embodiments and examples disclosed herein are illustrative and non-restrictive in any respect. The scope of the present invention is defined by the terms of the claims, rather than the description above, and is intended to include any modifications within the scope and meaning equivalent to the terms of the claims.

Industrial Applicability

The present rolling contact member, rolling bearing, and method of producing the rolling contact member is advantageously applicable particularly to rolling contact members, rolling bearings, and methods of producing rolling contact members, that adopt a sintered body containing β-sialon as a main component. The present torque transmission member for a universal joint, the present universal joint, and the present method of producing the torque transmission member for the universal joint are advantageously applicable particularly to torque transmission members for universal joints, universal joints, and methods of producing the torque transmission members for the universal joints, that adopt a sintered body containing β-sialon as a main component. The present sliding device, sliding member and method of producing the same is advantageously applicable particularly to sliding devices adopting for a constituent component a sintered body containing β-sialon as a main component, sliding members formed of a sintered body containing β-sialon as a main component, and methods of producing the same.

The invention claimed is:

1. A rolling contact member in a rolling bearing, the rolling contact member being one of a race member and a rolling element disposed in contact with said race member on an annular raceway, the rolling contact member being configured of a sintered body that contains β-sialon as a main component and has a remainder formed of an impurity, the rolling contact member having a rolling contact surface serving as a surface contacting another rolling contact member, said rolling contact surface included in a portion having a high density layer-higher in density than an inner portion;
   wherein said high density layer has a surface included in a portion having a higher density layer higher in density than another portion of said high density layer.

2. The rolling contact member according to claim 1, wherein when said high density layer is observed in cross section with an optical microscope with oblique illumination, said layer exhibits a portion observed as a portion white in color having an area ratio equal to or smaller than 7%.

3. The rolling contact member according to claim 1, wherein when said higher density layer is observed in cross section with an optical microscope with oblique illumination, said layer exhibits a portion observed as a portion white in color having an area ratio equal to or smaller than 3.5%.

4. A rolling bearing comprising:
   a race member; and
   a plurality of rolling elements disposed in contact with said race member on an annular raceway, at least one of said race member and said rolling element being the rolling contact member of claim 1.

5. A rolling contact member in a rolling bearing, the rolling contact member being one of a race member and a rolling element disposed in contact with said race member on an annular raceway, the rolling contact member being configured of a sintered body that contains β-sialon as a main component and has a remainder formed of a sintering additive and an impurity, the rolling contact member having a rolling contact surface serving as a surface contacting another rolling contact member, said rolling contact surface being included in a portion having a high density layer higher in density than an inner portion;

wherein said high density layer has a surface included in a portion having a higher density layer higher in density than another portion of said high density layer.

6. The rolling contact member according to claim 5, wherein when said high density layer is observed in cross section with an optical microscope with oblique illumination, said layer exhibits a portion observed as a portion white in color having an area ratio equal to or smaller than 7%.

7. The rolling contact member according to claim 5, wherein when said higher density layer is observed in cross section with an optical microscope with oblique illumination, said layer exhibits a portion observed as a portion white in color having an area ratio equal to or smaller than 3.5%.

8. A rolling bearing comprising:
a race member; and
a plurality of rolling elements disposed in contact with said race member on an annular raceway, at least one of said race member and said rolling element being the rolling contact member of claim 5.

* * * * *